(12) United States Patent
Wang et al.

(10) Patent No.: US 9,509,980 B2
(45) Date of Patent: *Nov. 29, 2016

(54) REAL-TIME CAPTURING AND GENERATING VIEWPOINT IMAGES AND VIDEOS WITH A MONOSCOPIC LOW POWER MOBILE DEVICE

(71) Applicant: QUALCOMM INCORPORATED, San Diego, CA (US)

(72) Inventors: Haohong Wang, San Diego, CA (US); Hsiang-Tsun Li, San Diego, CA (US); Sharath Manjunath, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,187

(22) Filed: Sep. 19, 2014

(65) Prior Publication Data

US 2015/0002627 A1  Jan. 1, 2015

Related U.S. Application Data

(63) Continuation of application No. 11/497,906, filed on Aug. 1, 2006.

(51) Int. Cl.
| | | |
|---|---|---|
| *H04N 13/02* | (2006.01) | |
| *H04N 13/00* | (2006.01) | |
| *H04N 5/232* | (2006.01) | |

(52) U.S. Cl.
CPC ........ *H04N 13/026* (2013.01); *H04N 5/23212* (2013.01); *H04N 13/0022* (2013.01); *H04N 13/0048* (2013.01); *H04N 13/0207* (2013.01); *H04N 13/0275* (2013.01)

(58) Field of Classification Search
None
See application file for complete search history.

(56) References Cited

U.S. PATENT DOCUMENTS

| | | | |
|---|---|---|---|
| 5,151,609 | A | 9/1992 | Nakagawa et al. |
| 5,305,092 | A | 4/1994 | Mimura et al. |
| 6,055,330 | A | 4/2000 | Eleftheriadis et al. |
| 6,128,071 | A | 10/2000 | Melen |

(Continued)

FOREIGN PATENT DOCUMENTS

| | | |
|---|---|---|
| EP | 1560425 A1 | 8/2005 |
| JP | 3096178 A | 4/1991 |

(Continued)

OTHER PUBLICATIONS

A. Azarbayejani et al.: "Recursive estimation of motion, structure, and focal length", IEEE Trans. Pattern Analysis and Machine Intelligence, vol. 17, No. 6, pp. 562-575, Jun. 1995.

(Continued)

*Primary Examiner* — Mehrdad Dastouri
*Assistant Examiner* — James Anderson, II
(74) *Attorney, Agent, or Firm* — Brent Boyd

(57) ABSTRACT

A monoscopic low-power mobile device is capable of creating real-time images and videos for multiple viewpoints from a single captured view. The device uses statistics from an autofocusing process to create a block depth map of a single capture view. Artifacts in the block depth map are reduced and an image depth map is created. Alternate views are created from the image depth map using a Z-buffer based surface recover process and a disparity map which is a function of a geometric vision model.

30 Claims, 24 Drawing Sheets

(56) References Cited

U.S. PATENT DOCUMENTS

| | | |
|---|---|---|
| 6,445,833 B1 | 9/2002 | Murata et al. |
| 6,816,158 B1 | 11/2004 | Lemelson et al. |
| 7,068,275 B2 | 6/2006 | Nakamura et al. |
| 7,126,598 B2 | 10/2006 | Oh et al. |
| 7,262,767 B2 | 8/2007 | Yamada |
| 7,272,670 B2 | 9/2007 | Baker et al. |
| 7,548,269 B2 | 6/2009 | Yata |
| 7,894,525 B2 | 2/2011 | Piehl et al. |
| 2001/0052935 A1 | 12/2001 | Yano |
| 2003/0007681 A1 | 1/2003 | Baker et al. |
| 2003/0080958 A1 | 5/2003 | Matsumoto et al. |
| 2003/0234791 A1 | 12/2003 | Boyd et al. |
| 2004/0032488 A1 | 2/2004 | Harman |
| 2004/0151366 A1 | 8/2004 | Nefian et al. |
| 2004/0208358 A1 | 10/2004 | Tooyama et al. |
| 2004/0217257 A1 | 11/2004 | Fiete et al. |
| 2004/0255058 A1 | 12/2004 | Baker et al. |
| 2008/0031327 A1 | 2/2008 | Wang et al. |

FOREIGN PATENT DOCUMENTS

| | | |
|---|---|---|
| JP | 5007373 A | 1/1993 |
| JP | H1032841 A | 2/1998 |
| JP | 10108152 A | 4/1998 |
| JP | 2001042200 A | 2/2001 |
| JP | 2001057648 A | 2/2001 |
| JP | 2001061164 A | 3/2001 |
| JP | 2001264624 A | 9/2001 |
| JP | 2003085578 A | 3/2003 |
| JP | 2003209858 A | 7/2003 |
| JP | 2003304562 A | 10/2003 |
| JP | 2004021979 A | 1/2004 |
| JP | 2004040445 A | 2/2004 |
| JP | 2004178581 A | 6/2004 |
| JP | 2004347871 A | 12/2004 |
| JP | 2006186795 A | 7/2006 |
| WO | 9724000 A1 | 7/1997 |
| WO | 0229711 A2 | 4/2002 |
| WO | 2007064495 A2 | 6/2007 |

OTHER PUBLICATIONS

"Applications and requirements for 3DAV", ISO/IEC JTC1/SC29/WG11, Awaji, Japan, Doc. N5416, 2002.

Curti, et al., "3D Effect Generation from Monocular View", 3D Data Processing Visualization and Transmission, 2002, Proceedings First International Symposium on p. 550, IEEE Nov. 7, 2002.

European Search Report—EP11184425—Search Authority—Munich—Mar. 28, 2012.

European Search Report—EP12171172—Search Authority—Munich—Jul. 24, 2012.

European Search Report—EP12171176—Search Authority—Munich—Jul. 24, 2012.

Geys et al.. "Hierarchical coarse to fine depth estimation for realistic view interpolation", 3-D Digital Imaging and Modeling, 2005. 3DIM 2005. Fifth International Conference on p. 237, IEEE Jun. 27, 2005.

International Search Report—PCT/US2007/074748, International Search Authority—European Patent Office—May 6, 2008.

J. Weng et al.: "Optimal motion and structure estimation", IEEE trans. Pattern Analysis and Machine Intelligence, vol. 15, No. 9, pp. 864-884, Sep. 1993.

K. Moustakas et al.: Stereoscopic video generation based on efficient layered structure and motion estimation from a monoscopic image sequence, IEEE Trans. Circuits and Systems for Video Technology, vol. 15, No. 8 pp. 1065-1073, Aug. 2005.

Onural, T, et al., "An Overview of a New European Consortium: Integrated Three-Dimensional Television-Capture Transmission and Display (3DTV)", in Proc. European Workshop on the Integration of Knowledge, Semantics and Digital Media Technology (EWIMT), pp. 1-8, 2004.

S.B. Xu: "Qualitative depth from monoscopic cues", in Proc. Int. Conf. on Image Processing and its Applications, pp. 437-440, 1992.

T. Jebara et al.: "3D structure from 2d motion", IEEE Signal Processing Magazine, vol. 16, No. 3, pp. 66-84, May 1999.

Written Opinion—PCT/US2007/074748, International Search Authority—European Patent Office—May 6, 2008.

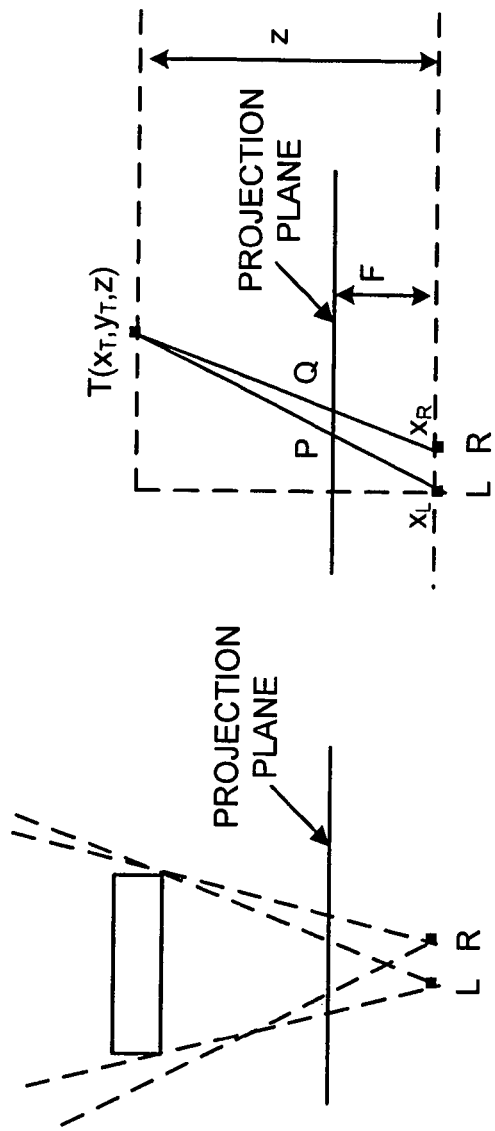

REAL-TIME CAPTURING AND GENERATING VIEWPOINT IMAGES AND VIDEOS WITH A MONOSCOPIC LOW POWER MOBILE DEVICE

CROSS-REFERENCE TO RELATED APPLICATIONS

This application is a continuation of and claims priority to U.S. application Ser. No. 11/497,906, filed Aug. 1, 2006, entitled "REAL-TIME CAPTURING AND GENERATING STEREO IMAGES AND VIDEOS WITH A MONOSCOPIC LOW POWER MOBILE DEVICE," the entirety of which is incorporated by reference. Furthermore, any and all priority claims identified in the Application Data Sheet, or any correction thereto, are hereby incorporated by reference under 37 C.F.R. §1.57.

BACKGROUND

I. Field

The present invention relates generally to monoscopic low-power mobile devices, such as a hand-held camera, camcorder, single-sensor cameral phone, or other single camera sensor device capable of creating real-time stereo images and videos. The present invention also relates to a method for generating real-time stereo images, a still image capturing device, and to a video image capturing device.

II. Background

Recently, enhancing the perceptual realism has become one of the major forces that drives the revolution of next generation multimedia development. The fast growing multimedia communications and entertainment markets call for 3D stereoscopic image and video technologies that cover stereo image capturing, processing, compression, delivery, and display. Some efforts on future standards, such as 3DTV and MPEG 3DAV, have been launched to fulfill such requests.

A major difference between a stereo image and a mono image is that the former provides the feel of the third dimension and the distance to objects in the scene. Human vision by nature is stereoscopic due to the binocular views seen by the left and right eyes in different perspective viewpoints. The human brain is capable of synthesizing an image with stereoscopic depth. In general, a stereoscopic camera with two sensors is required for producing a stereoscopic image or video. However, most of the current multimedia devices deployed are implemented within the monoscopic infrastructure.

In the past decades, stereoscopic image generation has been actively studied. In one study, a video sequence is analyzed and the 3D scene structure is estimated from the 2D geometry and motion activities (which is also called Structure from Motion (SfM)). This class of approaches enables conversion of recorded 2D video clips to 3D. However, the computational complexity is rather high so that it is not feasible for real-time stereo image generation. On the other hand, since SfM is a mathematically ill-posed problem, the result might contain artifacts and cause visual discomfort. Some other approaches first estimate depth information from a single-view still-image based on a set of heuristic rules according to specific applications, and then generate the stereoscopic views thereafter.

In another study, a method for extracting relative depth information from monoscopic cues, for example retinal sizes of objects, is proposed, which is useful for the auxiliary depth map generation. In a still further study, a facial feature based parametric depth map generation scheme is proposed to convert 2D head-and-shoulder images to 3D. In another proposed method for depth-map generation some steps in the approach, for example the image classification in pre-processing, are not trivial and maybe very complicated in implementation, which undermine the practicality of the proposed algorithm. In another method a real-time 2D to 3D image conversion algorithm is proposed using motion detection and region segmentation. However, the artifacts are not avoidable due to the inaccuracy of object segmentation and object depth estimation. Clearly, all the methods mentioned above consider only the captured monoscopic images. Some other approaches use an auxiliary source to help generate the stereo views. For example, a low cost auxiliary monochrome or low-resolution camera is used to capture the additional view, and then use a disparity estimation model to generate the depth map of the pixels.

In another example, a monoscopic high resolution color camera is used to capture the luminosity and chromaticity of a scene, and inexpensive flanking 3D-stereoscopic pair of low resolution monochrome "outrigger" cameras are used to augment luminosity and chromaticity with depth. The disparity maps generated from the obtained 3 views are used to synthesis the stereoscopic pairs. In a still further example, a mixed set of automatic and manual techniques are used to extract the depth map (sometimes automatic method is not reliable), and then a simple smoothing filter is used to reduce the visible artifacts of the result image.

As can be readily seen, there is a need for a low-complexity method to obtain real-time stereo images and videos by using a monoscopic mobile camera phone or other low-power monoscopic device.

There is a need for a monoscopic low-power mobile device that estimates the depth map information in a manner that avoids not only the auxiliary equipments or human-interaction used in other approaches, but also the introduced computational complexity by using SfM or depth analysis. There is a further need for a monoscopic low-power mobile device that employs a low-complexity approach to detect and estimate depth information for real-time capturing and generation of stereo video.

SUMMARY OF THE INVENTION

In view of the foregoing, an object of the present invention is to provide a monoscopic low-power mobile device that employs a low-complexity approach to detect and estimate depth information for real-time capturing and generation of stereo video.

Another object of the present invention is to provide a monoscopic low-power mobile device that avoids not only the auxiliary equipments or human-interaction, but also the introduced computational complexity by using SfM or depth analysis.

A further object of the present invention is to provide a monoscopic low-power mobile device that employs a low-complexity stereo image pair generation process.

A still further object of the present invention is to provide a monoscopic low-power mobile device that captures and generates stereo images and videos with superior 3D effects.

A still further object of the present invention is to provide a monoscopic low-power mobile device that can be used for both stereo image and video capturing and generation.

The above objects are carried out by a monoscopic low-power mobile device comprising: a single-sensor camera sensor module operable to capture an image and having an autofocusing sub-module operable to determine a best focus position by moving a lens through an entire focusing range via a focusing process and to select the focus position with a maximum focus value when capturing the image. The device includes a depth map generator assembly which is operable in a first-stage to develop a block-level depth map automatically using statistics from the autofocusing sub-module and in a second-stage to develop an image depth map. The device also includes an image pair generator module operable to create a missing second view from the captured image to create 3D stereo left and right views.

The monoscopic low-power mobile device uses an auto-focus function of a monoscopic camera sensor to estimate the depth map information, which avoids not only the auxiliary equipments or human-interaction used in other approaches, but also the introduced computational complexity by using SfM or depth analysis of other proposed systems.

The monoscopic low-power mobile device can be used for both stereo image and video capturing and generation with an additional but optional motion estimation module to improve the accuracy of the depth map detection for stereo video generation.

The monoscopic low-power mobile device uses statistics from the autofocus process to detect and estimate depth information for generating stereo images. The use of the autofocus process is feasible for low-power devices due to a two-stage depth map estimation design. That is, in the first stage, a block-level depth map is detected using the auto-focus process. An approximated image depth map is generated by using bilinear filtering in the second stage.

Additionally, the monoscopic low-power mobile device employs a low-complexity approach to detect and estimate depth information for real-time capturing and generation of stereo video. The approach uses statistics from motion estimation, autofocus processing, and the history data plus some heuristic rules to estimate the depth map.

The monoscopic low-power mobile device that employs a low-complexity stereo image pair generation process by using Z-buffer based 3D surface recovery.

As another aspect of the present invention, a method for generating real-time stereo images with monoscopic low-power mobile device comprises the steps of capturing an image; autofocusing a lens and determining a best focus position by moving the lens through an entire focusing range and for selecting the focus position with a maximum focus value when capturing the image; generating in a first-stage a block-level depth map automatically using statistics from the autofocusing step and in a second-stage generating an image depth map; and creating a missing second view from the captured image to create 3D stereo left and right views.

As another aspect of the present invention, a method for processing still images comprises the steps of: autofocusing processing a captured still image and estimating depth information of remote objects in the image to detect a block-level depth map; and approximating an image depth map from the block-level depth map.

The autofocusing processing includes the step of processing the image using a coarse-to-fine depth detection process. Furthermore, the approximating step comprises the step of bilinear filtering the block-level depth map to derive an approximated image depth map.

In a still further aspect, the present invention is directed to a program code having program instructions operable upon execution by a processor to: bilinear filter an image to determine a depth value of each focus block including corner points (A, B, C and D) of a block-level depth map, and determine the depth value ($d_P$) of all pixels within the block according to the following equation $$d_P = \frac{(x_P - x_A)^4 + (y_P - y_A)^4}{(x_P - x_A)^4 + (y_P - y_A)^4 + (x_P - x_B)^4 + (y_P - y_B)^4 + (x_P - x_C)^4 + (y_P - y_C)^4 + (x_P - x_D)^4 + (y_P - y_D)^4} d_A +$$

$$\frac{(x_P - x_B)^4 + (y_P - y_B)^4}{(x_P - x_A)^4 + (y_P - y_A)^4 + (x_P - x_B)^4 + (y_P - y_B)^4 + (x_P - x_C)^4 + (y_P - y_C)^4 + (x_P - x_D)^4 + (y_P - y_D)^4} d_B +$$

$$\frac{(x_P - x_C)^4 + (y_P - y_C)^4}{(x_P - x_A)^4 + (y_P - y_A)^4 + (x_P - x_B)^4 + (y_P - y_B)^4 + (x_P - x_C)^4 + (y_P - y_C)^4 + (x_P - x_D)^4 + (y_P - y_D)^4} d_C +$$

$$\frac{(x_P - x_D)^4 + (y_P - y_D)^4}{(x_P - x_A)^4 + (y_P - y_A)^4 + (x_P - x_B)^4 + (y_P - y_B)^4 + (x_P - x_C)^4 + (y_P - y_C)^4 + (x_P - x_D)^4 + (y_P - y_D)^4} d_D.$$

wherein position values and the depth values for the corners points (A, B, C, and D) of the block are denoted as ($x_A$, $y_A$, $d_A$), ($x_B$, $y_B$, $d_B$), ($x_C$, $y_C$, $d_C$), ($x_D$, $y_D$, $d_D$); and a respective pixel denoted by a point P ($x_P$, $y_P$, $d_P$).

In a still further aspect of the present invention, a still image capturing device comprises: an autofocusing module operable to process a captured still image and estimate depth information of remote objects in the image to detect a block-level depth map; an image depth map module operable to approximate from the block-level depth map an image depth map using bilinear filtering; and an image pair generator module operable to create a missing second view from the captured image to create three-dimensional (3D) stereo left and right views.

In a still further aspect of the present invention, a video image capturing device comprises: an autofocusing module operable to process a captured video clip and estimate depth information of remote objects in a scene; and a video coding module operable to code the video clip captured, provide statistics information and determine motion estimation. A depth map generator assembly is operable to detect and estimate depth information for real-time capturing and generation of stereo video using the statistics information from the motion estimation, the process of the autofocusing module, and history data plus heuristic rules to obtain a final block depth map from which an image depth map is derived.

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement of processes shown. In the drawings:

FIG. 12A illustrates left and right view of binocular vision;

FIG. 12B illustrates a geometry model of binocular vision with parameters for calculating the disparity map;

DETAILED DESCRIPTION

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

Figure 1:
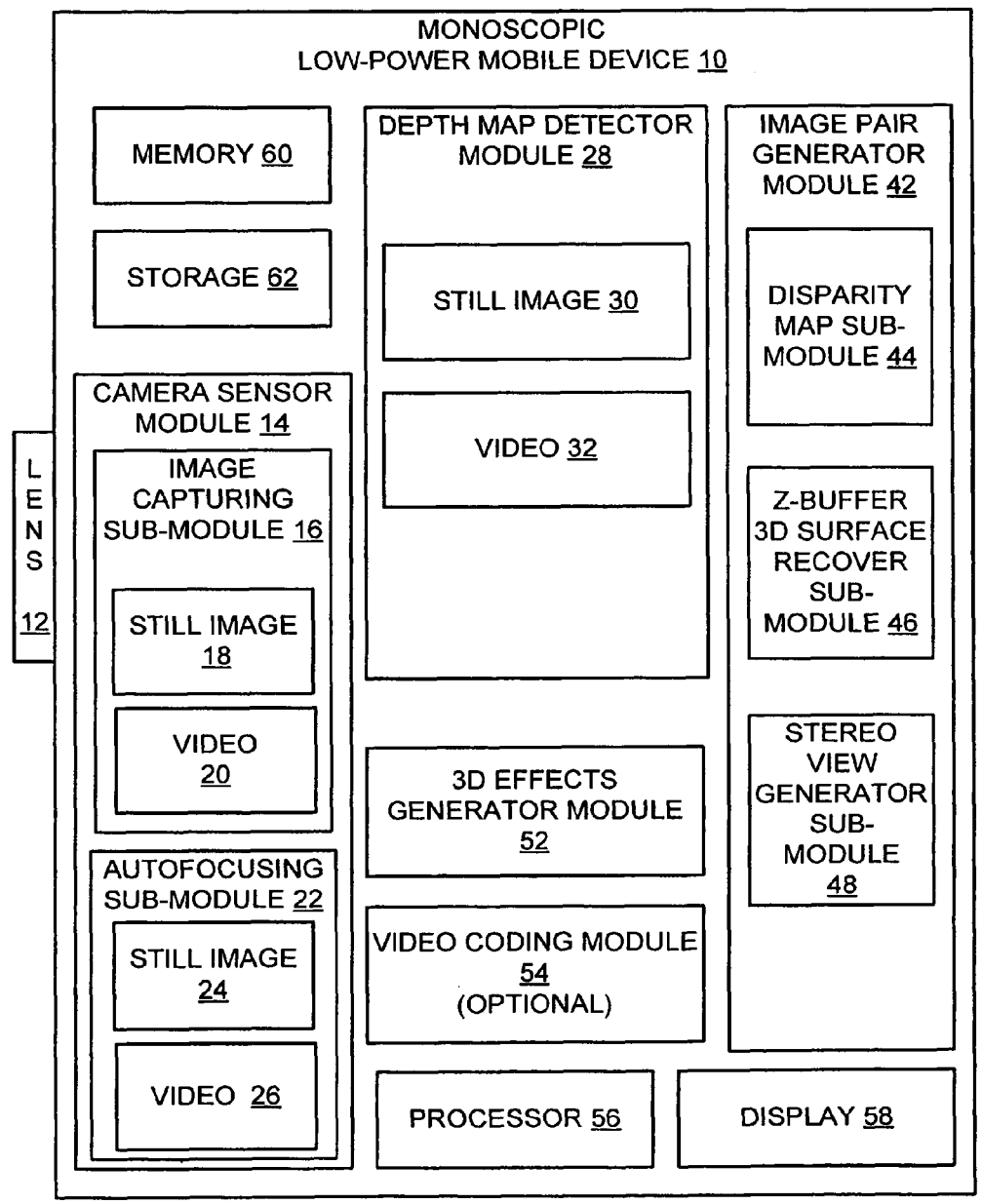
FIG. 1 illustrates a general block diagram of a monoscopic low-power mobile device.

The preferred embodiment of the device for capturing and generating stereo images and videos according to the present invention is described below with a specific application to a monoscopic low-power mobile device such as a hand-held camera, camcorder, or a single-sensor camera phone. However, it will be appreciated by those of ordinary skill in the art that the present invention is also well adapted for other types of devices with single-sensor camera modules. Referring now to the drawings in detail, wherein like numerals are used to indicate like elements throughout, there is shown in FIG. 1, a monoscopic low-power mobile device, generally designated at 10, according to the present invention.

The monoscopic low-power mobile device 10 includes in general a processor 56 to control the operation of the device 10 described herein, a lens 12 and a camera sensor module 14 such as a single-sensor camera unit, a hand-held digital camera, or a camcorder. The processor 56 executes program instructions or programming code stored in memory 60 to carryout the operations described herein. The storage 62 is the file system in the camera, camcorder, or single-sensor unit and may include a flash, disc, or tape depending on the applications.

The camera sensor module 14 includes an image capturing sub-module 16 capable of capturing still images in a still image mode 18 and capturing videos over a recording period in a video mode 20 to form a video clip. The camera sensor module 14 also includes an autofocusing sub-module 22 having dual modes of operation, a still image mode 24 and a video mode 26.

Figure 2:
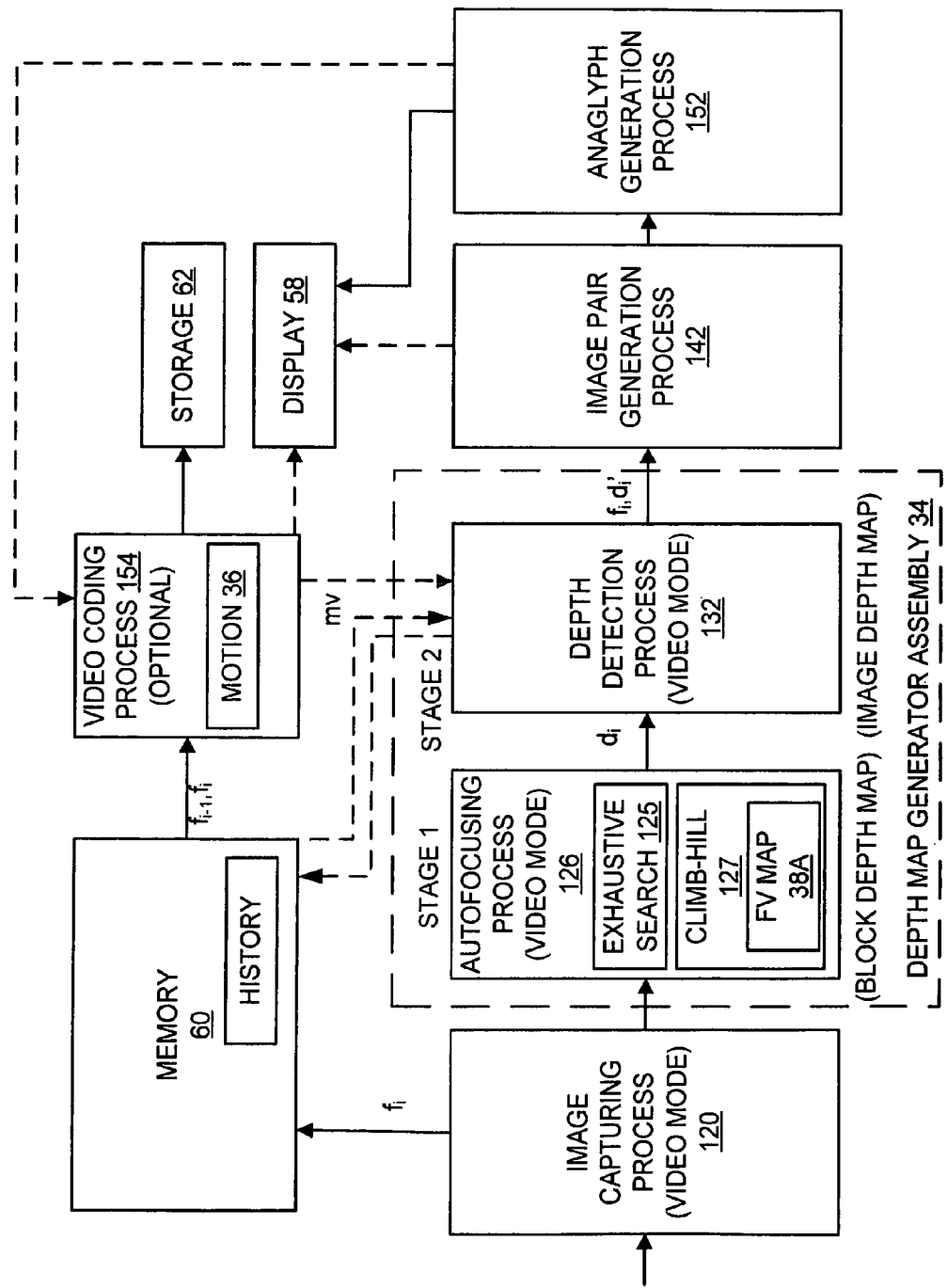
FIG. 2 illustrates a general block diagram of the operation for both real-time stereo image and video data capturing, processing, and displaying.
Figure 3:
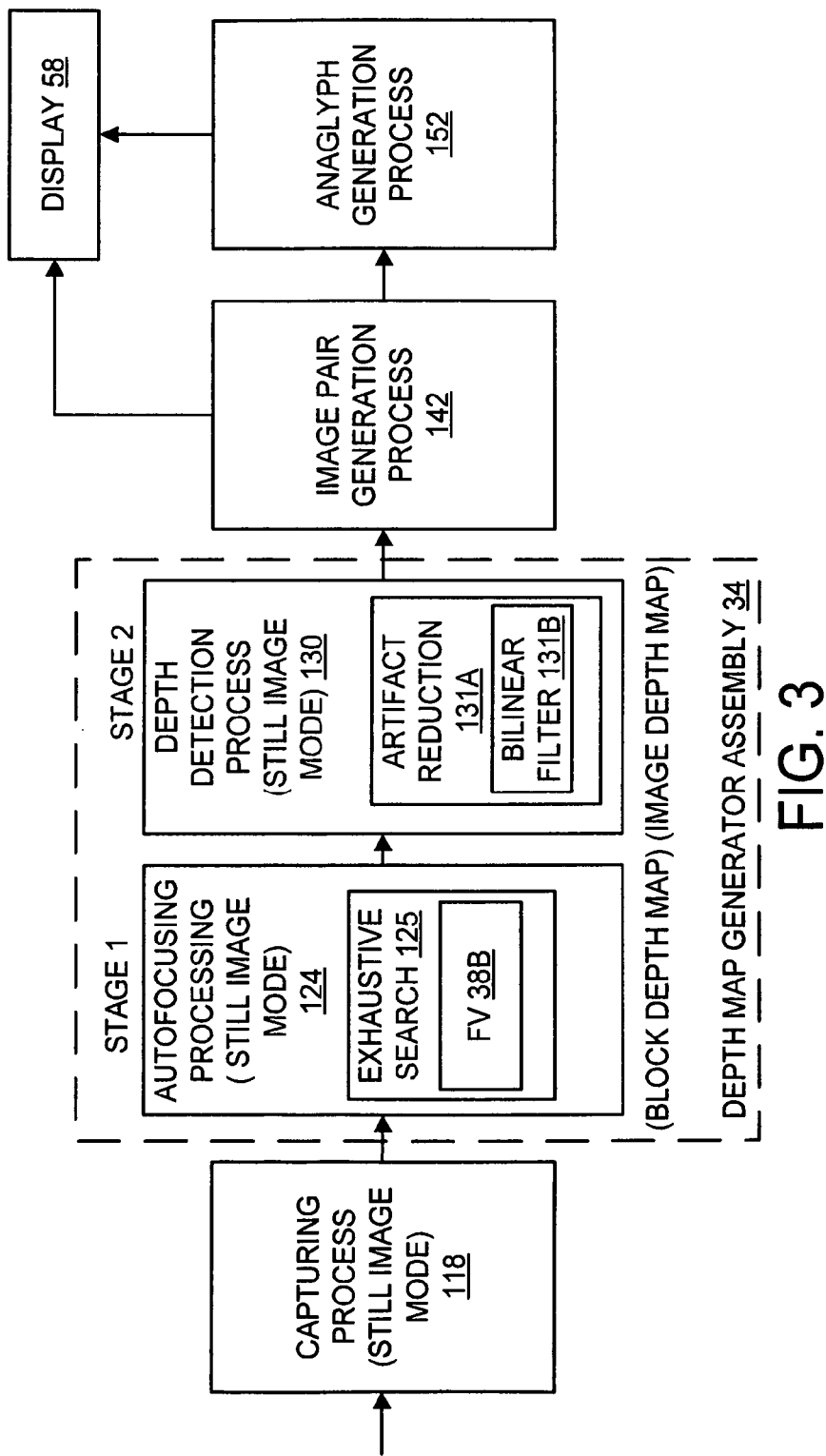
FIG. 3 illustrates a general block diagram of the operation for real-time capturing and generating 3D still images.

The monoscopic low-power mobile device 10 further includes a depth map detector module 28 also having dual modes of operation, namely a still image mode 30 and a video mode 32. In the exemplary embodiment, a depth map generator assembly 34 employs a two-stage depth map estimation process with dual modes of operation. As best seen in FIGS. 2 and 3, the first stage (STAGE 1) of the two-stage depth map estimation process develops a block-level depth map automatically using statistics from the autofocusing processing 124 in the still mode 24 or 126 in the video mode 26 carried out by the autofocusing sub-module 22. In a second stage, an image depth map is created by a depth detection process 130 in the still mode 30 or 132 in the video mode 32 carried out by the depth map detector module 28. In FIG. 2, $f_i$ denotes the ith frame, $f_{i-1}$ denotes the i−1 frame, $d_i$ denotes the block depth map (BDM) of the ith frame, and $d_i'$ denotes the image depth map (IDM) of the ith frame.

The monoscopic low-power mobile device 10 has a single-sensor camera sensor module 14. Accordingly, only one image is captured, such image is used to represent a Left (L) view for stereo imaging and displaying. An image pair generator module 42 is included in device 10 to generate a second or missing Right (R) view in the stereo view generator sub-module 48 from the Left view (original captured image) and an image depth map. The image pair generator module 42 also includes a disparity map sub-module 44 and a Z-buffer 3D surface recover sub-module 46.

In the exemplary embodiment, the 3D effects are displayed on display 58 using a 3D effects generator module 52. In the exemplary embodiment, the 3D effects generator module 52 is an inexpensive red-blue anaglyph to demonstrate the resulting 3D effect. The generated stereo views are feasibly displayed by other mechanisms such as holographic and stereoscopic devices.

Optionally, the monoscopic low-power mobile device 10 includes a video coding module 54 for use in coding the video. The video coding module 54 provides motion (estimation) information 36 for use in the depth detection process 132 in the video mode 32 by the depth map detector module 28.

Referring also to FIG. 3, in operation the camera sensor module 14 captures one or more still images in an imaging capturing sub-module 16 in a still image mode 18. The still image mode 18 performs the capturing process 118. The capturing process 118 is followed by an autofocusing processing 124. In general, the autofocusing processing 124 of the still image mode 24 is utilized to estimate the depth information of remote objects in the scene. To reduce the computational complexity, a block depth detection in STAGE 1 employs a coarse-to-fine depth detection algorithm in an exhaustive focusing search 125 of the still image mode 24. The coarse-to-fine depth detection algorithm divides the image captured by the capturing process 118 in the still image mode 18 into a number of blocks which detects the associated depth map in the earlier stage (STAGE 1). In STAGE 2, the depth detection process 130 in the still image mode 30 uses a bilinear filter 131B to derive an approximated image depth map from the block depth map of STAGE 1.

The autofocusing sub-module 22 in a still image mode 24 employs an exhaustive search focusing 125 used in still-image capturing. In order to achieve real-time capturing of video clips in a video image mode 26, the exhaustive search focusing 125 is used in still-image capturing is replaced by a climbing-hill focusing 127, and the depth detection process 132 of the video sub-module 32 detects the block depth map 34 based on motion information 36 from a video coding module 54, the focus value 38B from the autofocusing process 126, and frame history statistics 40, shown in FIG. 2.

Automatic Depth Map Detection

Referring still to FIG. 3, the monoscopic low-power mobile device 10 takes advantage of the autofocusing process 124 of the autofocusing sub-module 22 for automatic block depth map detection. For image capturing in the still-image mode 18 and the video mode 20 of operation, different approaches are needed due to the different focus length search algorithms employed in these scenarios (modes of operation).

In digital cameras, most focusing assemblies choose the best focus position by evaluating image contrast on the imager plane. Focus value (FV) 38B is a score measured via a focus metric over a specific region of interest, and the autofocusing process 126 normally chooses the position corresponding to the highest focus value as the best focus position of lens 12. In some cameras, the high frequency content of an image is used as the focus value (FV) 38B, for example, the high pass filter (HPF) below $$HPF = \begin{bmatrix} -1 & 0 & 0 & 0 & -1 \\ 0 & 0 & 4 & 0 & 0 \\ -1 & 0 & 0 & 0 & -1 \end{bmatrix}$$

can be used to capture the high frequency components for determining the focus value (FV) 38B. Focus value (FV) is also a FV map as described later in the video mode.

Figure 4:
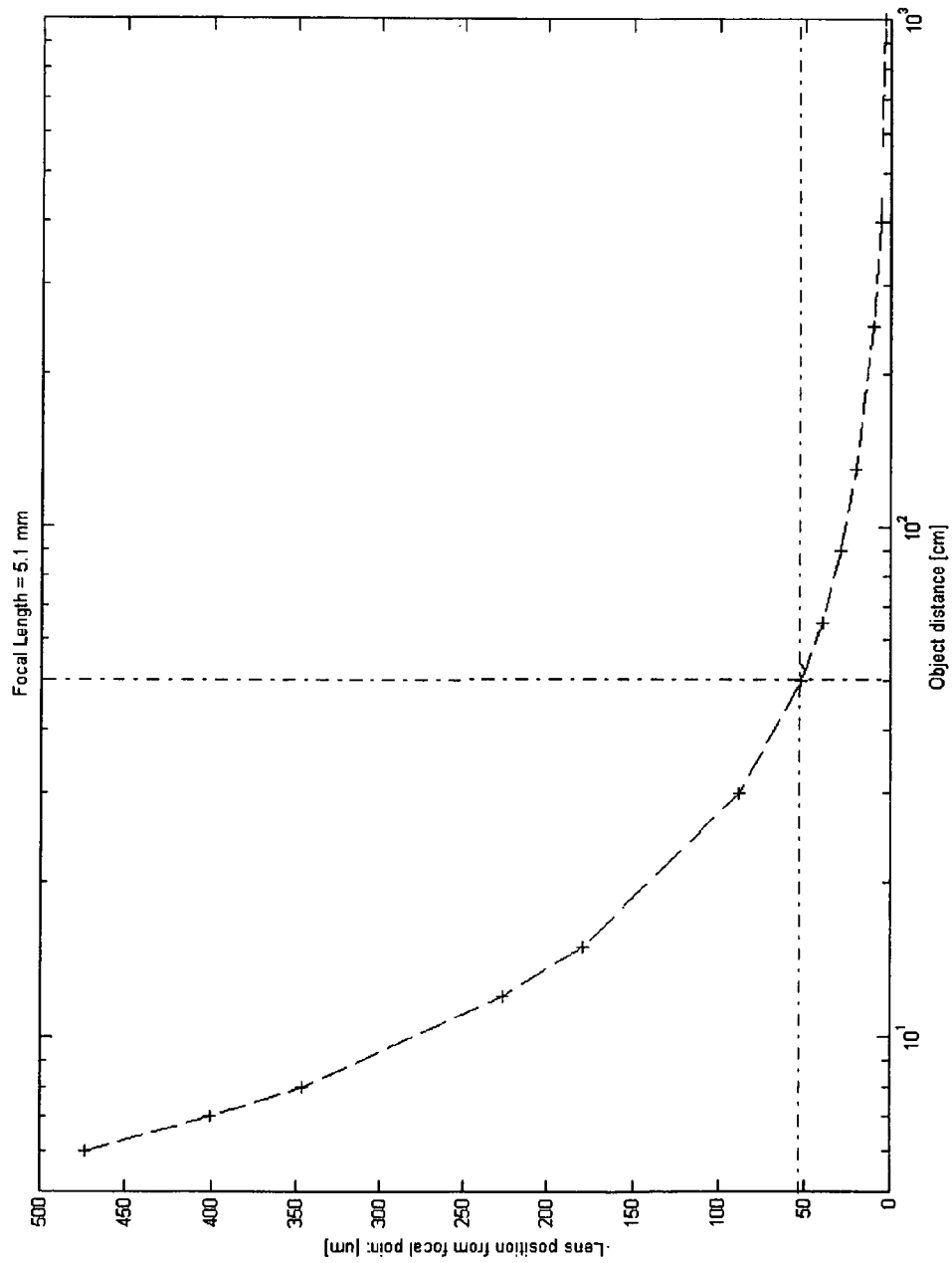
FIG. 4 illustrates a plot of a relationship between lens position from the focal point and object distance.

There is a relationship between the lens position of lens 12 from the focal point (FV) 38B and the target distance from the camera or device 10 with a camera (as shown in FIG. 4), and the relationship is fixed for a specific camera sensor module 14. Various camera sensors may have different statistics of such relationships. Thus, once the autofocusing process 124 in the autofocusing sub-module 22 locates the best focus position of the lens 12, based on the knowledge of the camera sensor module's property, the actual distance is estimated between the target object and the camera or device 10, which is also the depth of the object in the scene. Therefore, the depth map detection process relies on a sensor-dependent autofocusing process 124 or 126.

In the still-image capturing mode 18, most digital camera sensor modules 14 choose exhaustive search algorithm 125 for the autofocusing process 124, which determines the best focus position by moving its lens 12 through the entire focusing range and selecting the focus position with the maximum focus value.

Figure 5A:
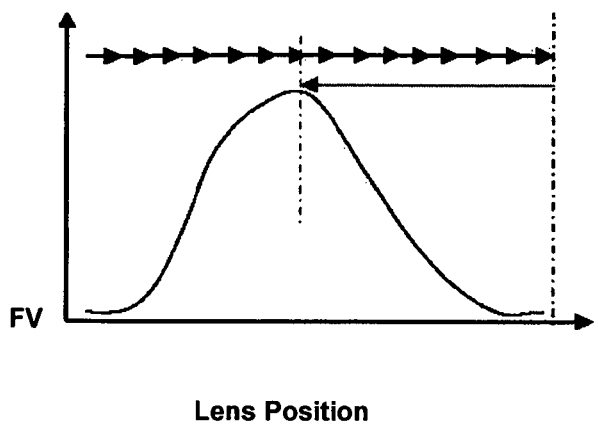
FIG. 5A illustrates a graph of the relationship between lens position and FV using a global search algorithm.
Figure 5B:
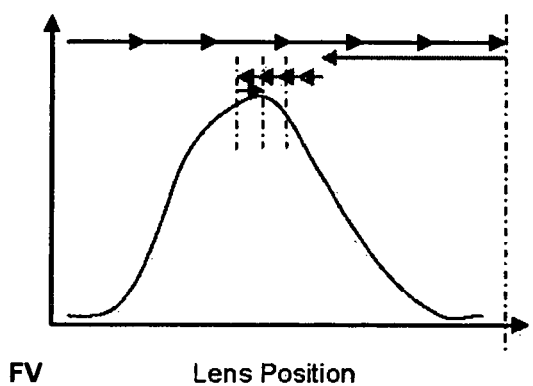
FIG. 5B illustrates a graph of the relationship between lens position and FV for a coarse-to-fine search algorithm.

A typical example of an exhaustive search algorithm 125 is a global search described in relation to FIG. 5A, which scans the whole focus range with the smallest motor step denoted by the row of equally-spaced arrow heads. On the other hand, FIG. 5B shows a coarse-to-fine search, which searches the whole focus range using a bigger step first, denoted by the row of arrow heads, then search around the peak position using a smaller step denoted by the arrow heads with a smaller distance between adjacent arrow heads.

Clearly, the accuracy of the depth map generated for a still-image is purely dependent on the sizes of the spot focus windows selected for the image. In general, in the autofocusing process 124 for the still-image mode 24, the image is split into N×N sub-blocks, which is also called spot focus windows, and the focus values 38B are calculated for each focus windows during the autofocusing process 124.

After the exhaustive search 125, the best focus position of the lens 12 is obtained for each focus window, and thus the depth of the object corresponding to each window can be estimated. Clearly, the smaller the focus window size, the better accuracy of the depth map, and the higher computational complexity.

Figure 6A:
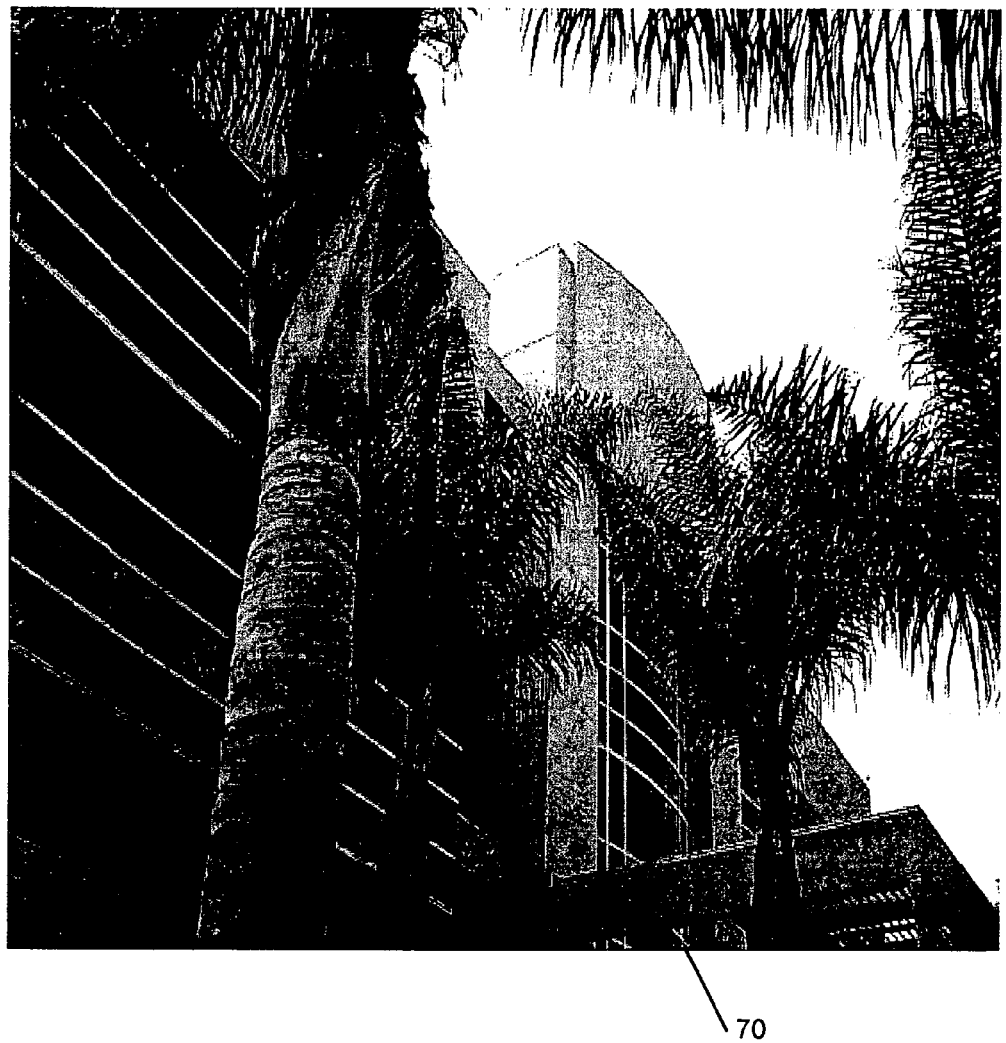
FIG. 6A illustrates an original image.
Figure 6B:
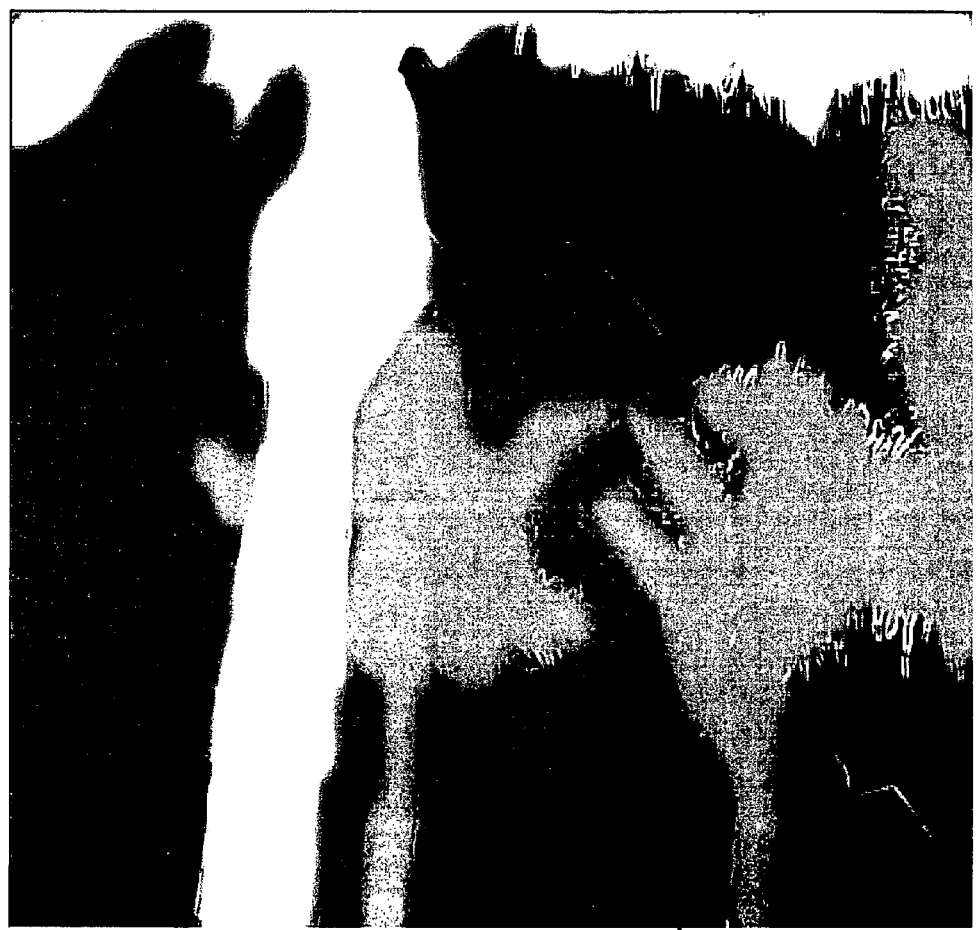
FIG. 6B illustrates an image depth map of the image of FIG. 6A
Figure 6C:
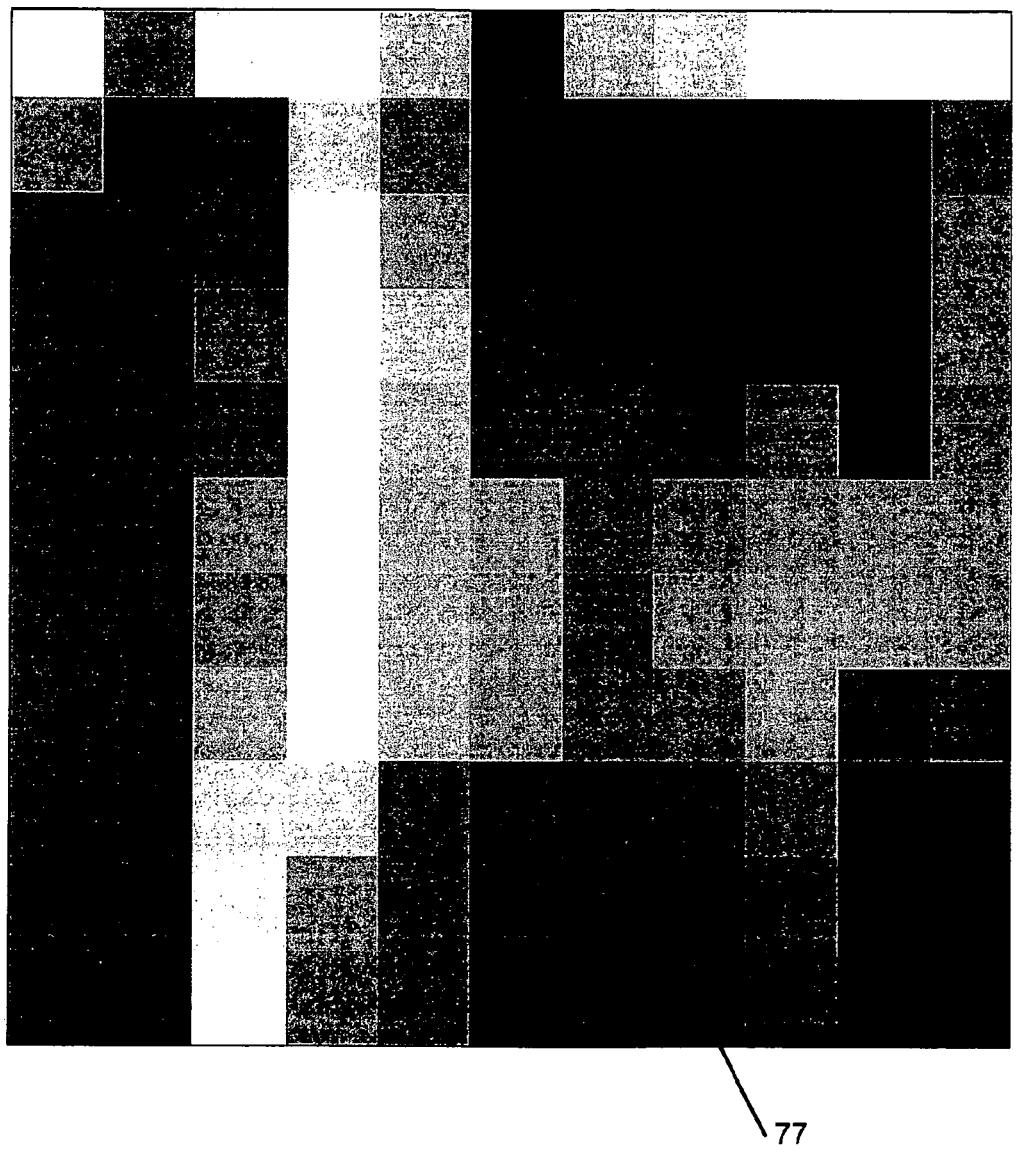
FIG. 6C illustrates an block depth map of the image of FIG. 6A.

In the monoscopic low-power mobile device 10, two types of depth maps: image depth map (IDM) and block depth map (BDM), are defined in the depth map generator assembly 34. For an image depth map, the pixel depth value of every pixel is stored by the depth detection process 130; for the block depth map, the depth value of each focus window is stored. In FIG. 6B, the image depth map 75 corresponding to the still-image 70 shown in FIG. 6A is obtained by setting the focus window size as 1×1 and thus the image depth map 75 is in pixel-level accuracy, where pixels with higher intensity correspond to objects closer to the viewpoint. However, this setting is normally infeasible for most applications due to excessive computational complexity for auto focusing. An example of block depth map 77 is shown in FIG. 6C where N is set to be 11 and it is a more practical setting for cameras with normal computation capability.

Figure 6D:
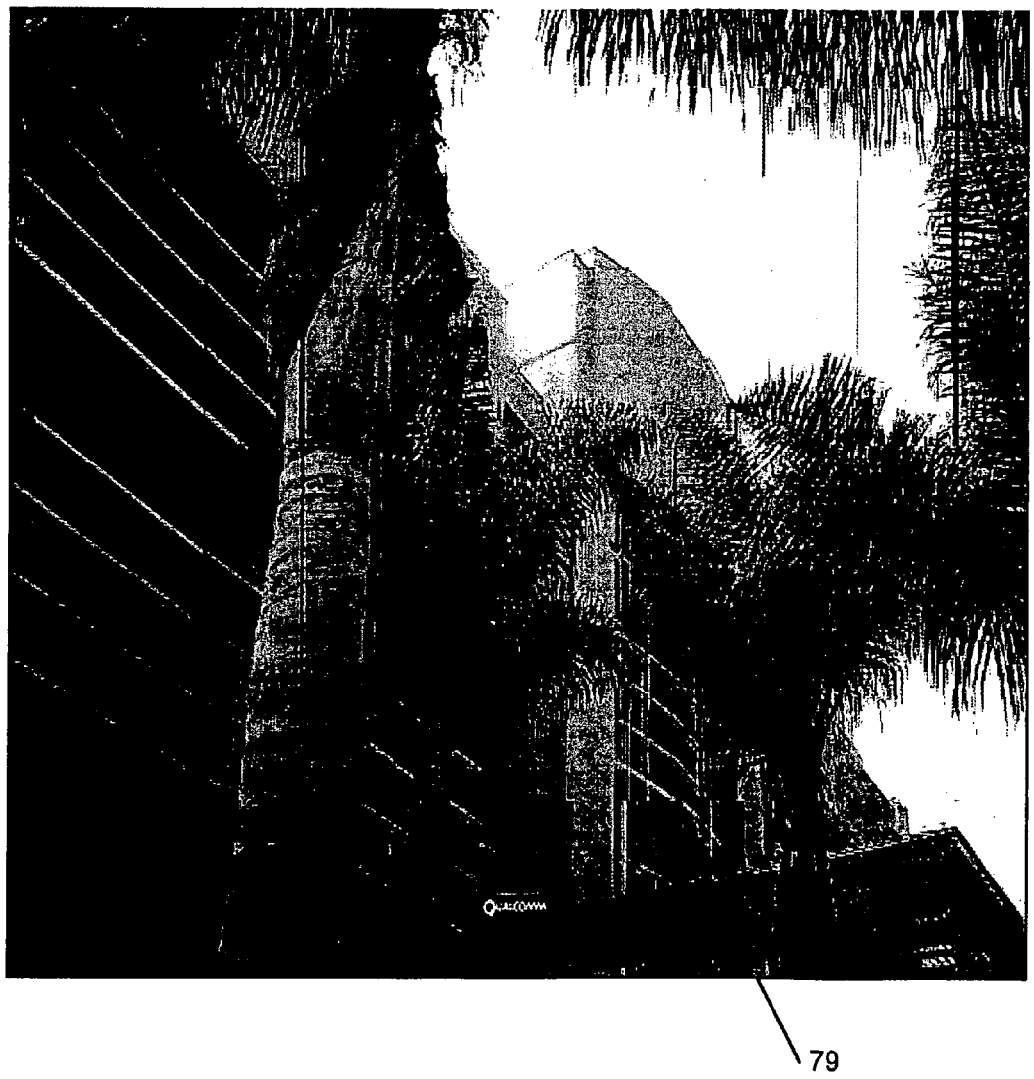
FIG. 6D illustrates an synthesized 3D anaglyph view using the block depth map of FIG. 6C.
Figure 6E:
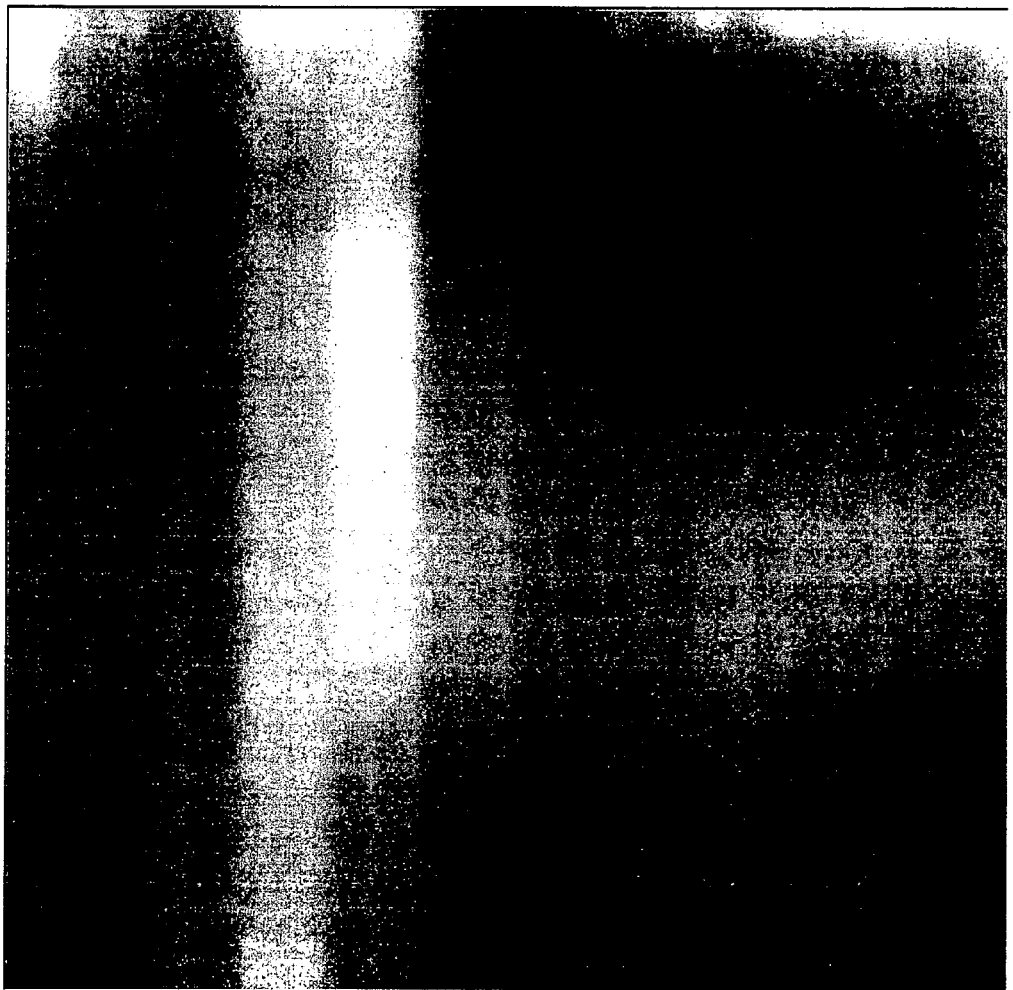
FIG. 6E illustrates a filtered depth map of the image of FIG. 6B.

In general, the block depth map 77, created in STAGE 1 by the autofocusing process 124 needs to be further processed to obtain an image depth map 80 (FIG. 6E); otherwise, some artifacts may appear. An example of a synthesized 3D anaglyph view 79 using the block depth map 77 shown in FIG. 6C is shown in FIG. 6D, where the artifacts appear due to the fact that the sharp depth gap between neighbor focus windows at the edges does not correspond to the actual object shape boundaries in the image. The artifacts can be reduced by an artifact reduction process 131A followed by processing by a bilinear filter 131B. The filtered image depth map 80 is shown in FIG. 6E.

Figure 7B:
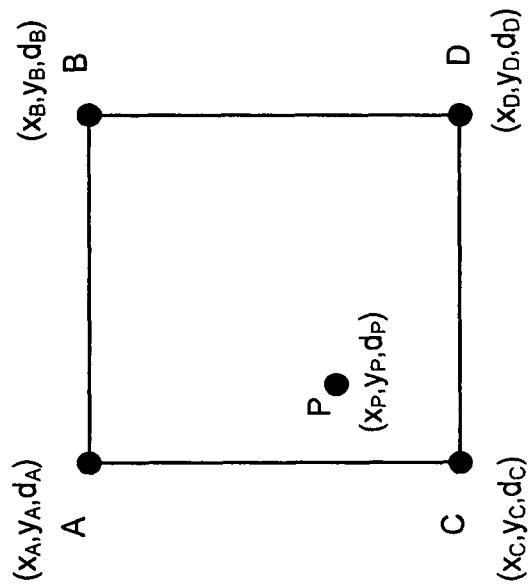
FIG. 7B illustrates a diagram of a block with corner points.
Figure 7A:
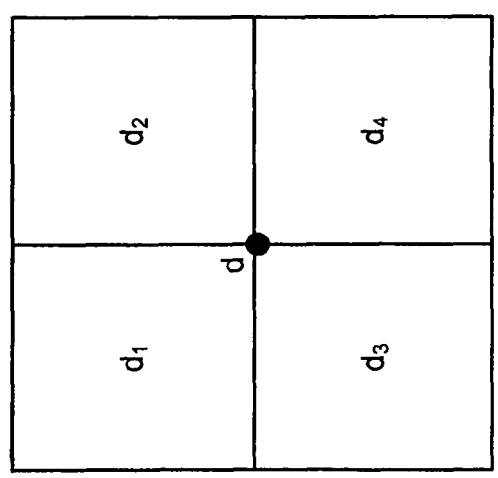
FIG. 7A illustrates an a diagram of a middle point with neighboring blocks.

The artifacts reduction process 131A, consists of two steps, as best illustrated in FIGS. 7A and 7B. In the first step, the depth value of the corner points A, B, C, and D of each block in FIG. 6C is found during the autofocusing process 124, and the depth value would be the average value of its neighboring blocks as shown in FIG. 7A where the depth of the middle point d is defined by equation Eq. (1)

$$d = \frac{d_1 + d_2 + d_3 + d_4}{4}, \qquad \text{Eq. (1)}$$

where d1, d2, d3, and d4 are depth value of the neighboring blocks.

The block depth map created by the autofocusing process 124 includes the depth value of each focus window/block which is stored. In FIG. 3, the memory 60 and/or storage 62 (shown in FIG. 2) which are the hardware blocks are not illustrated in the process shown.

After the depth value of all corner points A, B, C and D are obtained, in the second step as best illustrated in FIG. 7B, bilinear filtering obtains the depth value of the pixels inside the blocks. As shown as an example in FIG. 7B, the position and depth values for the corners points A, B, C, and D of the block are denoted as $(x_A, y_A, d_A)$, $(x_B, y_B, d_B)$, $(x_C, y_C, d_C)$, $(x_D, y_D, d_D)$, so the depth value of all the pixels within the block can be calculated. For example, for the pixel denoted by the point P $(x_P, y_P, d_P)$, the pixel depth value $d_P$ can be obtain by equation Eq.(2) below $$d_P = \frac{(x_P - x_A)^4 + (y_P - y_A)^4}{(x_P - x_A)^4 + (y_P - y_A)^4 + (x_P - x_B)^4 + (y_P - y_B)^4 + (x_P - x_C)^4 + (y_P - y_C)^4 + (x_P - x_D)^4 + (y_P - y_D)^4} d_A +$$

$$\frac{(x_P - x_B)^4 + (y_P - y_B)^4}{(x_P - x_A)^4 + (y_P - y_A)^4 + (x_P - x_B)^4 + (y_P - y_B)^4 + (x_P - x_C)^4 + (y_P - y_C)^4 + (x_P - x_D)^4 + (y_P - y_D)^4} d_B +$$

$$\frac{(x_P - x_C)^4 + (y_P - y_C)^4}{(x_P - x_A)^4 + (y_P - y_A)^4 + (x_P - x_B)^4 + (y_P - y_B)^4 + (x_P - x_C)^4 + (y_P - y_C)^4 + (x_P - x_D)^4 + (y_P - y_D)^4} d_C +$$

$$\frac{(x_P - x_D)^4 + (y_P - y_D)^4}{(x_P - x_A)^4 + (y_P - y_A)^4 + (x_P - x_B)^4 + (y_P - y_B)^4 + (x_P - x_C)^4 + (y_P - y_C)^4 + (x_P - x_D)^4 + (y_P - y_D)^4} d_D.$$

Referring now to FIG. 2, for video, the exhaustive search algorithm 125 is not feasible due to the excessive delay caused in determining the best focus. Hill climbing focusing 127 is more popular because of its faster search speed. It searches the best focus position like climbing a hill. When the camera sensor module 14 starts to record video in the video mode 20 in the image capturing sub-module 16, an exhaustive search algorithm 125 is used to find the best focus position as an initial position, but after the initial lens position is located, the camera sensor module 14 needs to determine in real-time the direction the focus lens 12 has to move and by how much in order to get to the top of the hill. Clearly, getting accurate depth maps for videos, during the video mode 26 of the autofocusing process 126, is much more difficult than that for still-images. While not wishing to be bound by theory, the reason is that hill climbing focusing only obtains the correct depth for the area in focus, while not guaranteeing the correctness of depth for other blocks. In addition, the exhaustive search algorithm 125, which guarantees the correctness of depth for all blocks, is only called at the starting point of recording, so it is impossible to correct the depths of all the blocks during the recording period of the video mode 20 in the image capturing sub-module 16.

Figure 8:
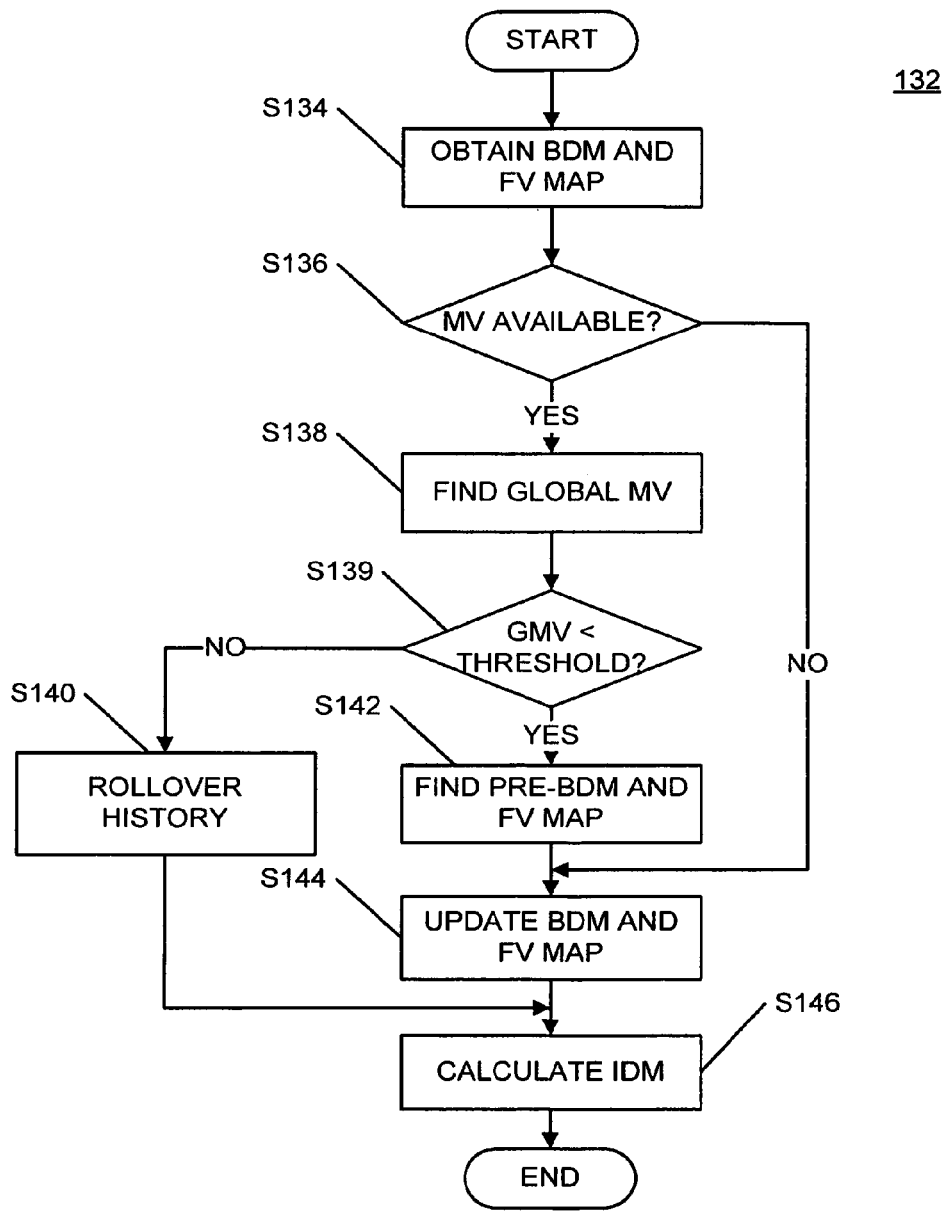
FIG. 8 illustrates a flowchart for the depth map generation process.

Referring now to FIG. 8, a flowchart of the depth map detection process 132 for use in the video mode 32 by the depth map detector module 28 is shown. The current frame index is denoted by n, the $\{D_n(i,j)\}$ and $\{F_n(i,j)\}$ (i=1, 2, ... N, j=1, 2, ... N) are the final determined block depth map (BDM) and focus value (FV) map 38A of the current frame, $\{M_n(i,j)\}$ and $\{V_n(i,j)\}$ are the internal BDM and FV map obtained by the autofocusing process 126, and $\{P_n(i,j)\}$ and $\{T_n(i,j)\}$ are the internal BDM and FV map obtained by motion prediction.

During the depth detection process 132 in video mode 32, the focus position of current frame n is first determined by hill climbing focusing 127 and the corresponding block depth map $\{M_n(i, j)\}$ and FV map 38B $\{V_n(i, j)\}$ are obtained at step S134. Step S134 is followed by step S136 where a determination is made whether motion information (MV) 36 is available from the video coding process 154 performed by the video coding module 54. If the determination is "YES," then, the motion information (MV) 36 is analyzed and the global motion vector (GMV) is obtained at step S138. Step S138 is followed by step S139 where a determination is made whether the global motion (i.e., the GMV) is greater than a threshold. If the determination is "YES," than the lens 12 is moving to other scenes, then the tasks of maintaining an accurate scene depth history and estimating the object movement directions uses a different process.

If the determination at step S139 is "YES," set $D_n(i,j)=M_n(i,j)$ and $F_n(i,j)=V_n(i,j)$, and clean up the stored BDM and FV map history of previous frames at step S144 during an update process of the BDM and FV map.

Returning again to step S136, in some systems, the motion information 36 is unavailable due to all kinds of reasons, for example, the video is not coded, or the motion estimation module of the coding algorithm has been turned off. Thus, the determination at step S136 is "NO," and step S136 followed to step S144, to be described later. When the determination is "NO" at step S136, the process assumes the motion vectors are zeros for all blocks.

If the motion information 36 are available, step S139 is followed by step S142 where the process 132 predicts the BDM and FV map of current frame $P_n(i,j)$ and $T_n(i,j)$ from those of the previous frame by equations Eq.(3) and Eq.(4)

$$P_n(i, j) = \begin{cases} D_{n-1}(a, b) & \text{if } |V_n(i, j) - F_{n-1}(a, b)| < \text{FV\_TH} \\ D_{n-1}(i, j) & \text{otherwise} \end{cases} \quad \text{Eq. (3)}$$

and $$T_n(i, j) = \begin{cases} F_{n-1}(a, b) & \text{if } |V_n(i, j) - F_{n-1}(a, b)| < \text{FV\_TH} \\ F_{n-1}(i, j) & \text{otherwise} \end{cases} \quad \text{Eq. (4)}$$

where the block (a,b) in (n−1)st frame is the prediction of block (i, j) in the nth frame, and FV_TH is a threshold for FV difference.

Step S142 is followed by step S144, where the device 10 assumes that the better focus conveys more accurate depth estimation. Therefore, the focal lens position corresponds to the largest FV and is treated as the best choice. Based on such logic, the final BDM and FV map are determined by equations Eq. (5) and Eq. (6)

$$D_n(i, j) = \qquad\qquad\qquad\qquad\qquad\qquad\qquad \text{Eq. (5)}$$
$$\begin{cases} D_{n-1}(i, j) & \text{if } F_{n-1}(i, j) \geq V_n(i, j) \, \& F_{n-1}(i, j) \geq T_n(i, j) \\ M_n(i, j) & \text{if } V_n(i, j) \geq F_{n-1}(i, j) \, \& V_n(i, j) \geq T_n(i, j) \\ P_n(i, j) & \text{if } T_n(i, j) \geq F_{n-1}(i, j) \, \& T_n(i, j) \geq V_n(i, j) \end{cases}$$

and $$F_n(i, j) = \max[F_{n-1}(i, j), V_n(i, j), T_n(i, j)]. \quad \text{Eq. (6)}$$

where $\{D_n(i,j)\}$ and $\{F_n(i,j)\}$ (i=1, 2, ... N, j=1, 2, ... N) are the final determined block depth map (BDM) and focus value (FV) map 38A of the current frame; $\{M_n(i, j)\}$ and $\{V_n(i, j)\}$ are the internal BDM and FV map obtained by the autofocusing process 126; and $\{P_n(i, j)\}$ and $\{T_n(i, j)\}$ are the internal BDM and FV map obtained by motion prediction.

As expected, the equations Eqs. (5) and (6) are not accurate for all cases. Equations Eq. (5) and Eq. (6) would fail for some difficult scenarios such as when occlusion/exposure occurs. In general, it is reasonable to assume that the video frames are captured at a speed of 15-30 frames per second, and the object in the frames are moving in reasonable speed, so that an object would not move too far away in neighbor frame.

Heuristic rules refer to the assumptions and logics for equations Eq. (3)-(6) set forth above and in the flowchart shown in FIG. 8. These rules are actually coded in the programs, and the history data are stored in memory 60 to estimate the depth map.

After the BDM is obtained, the image depth map (IDM) is calculated at step S146 from the BDM results of step S144 based on the same approach described in relation to the depth detection process 130 for the still image mode. Thus, the BDM of step S144 is subject to artifact reduction 131A and bilinear filtering by bilinear filter 131B (FIG. 3).

Returning to step S139, if the determination is "NO," step S139 is followed by step S140 where the history is rolled over. At step S140, rollover history refers to the following actions: If the global motion (i.e., the GMV is greater than a threshold) is detected, which means the camera lens is moving to other scenes, then the tasks of maintaining an accurate scene depth history and estimating the object movement directions becomes different. For this case, set $D_n(i,j)=M_n(i,j)$ and $F_n(i,j)=V_n(i,j)$, and clean up the stored BDM and FV map history of previous frames. Step S140 is then followed by step S146.

Figure 9A:
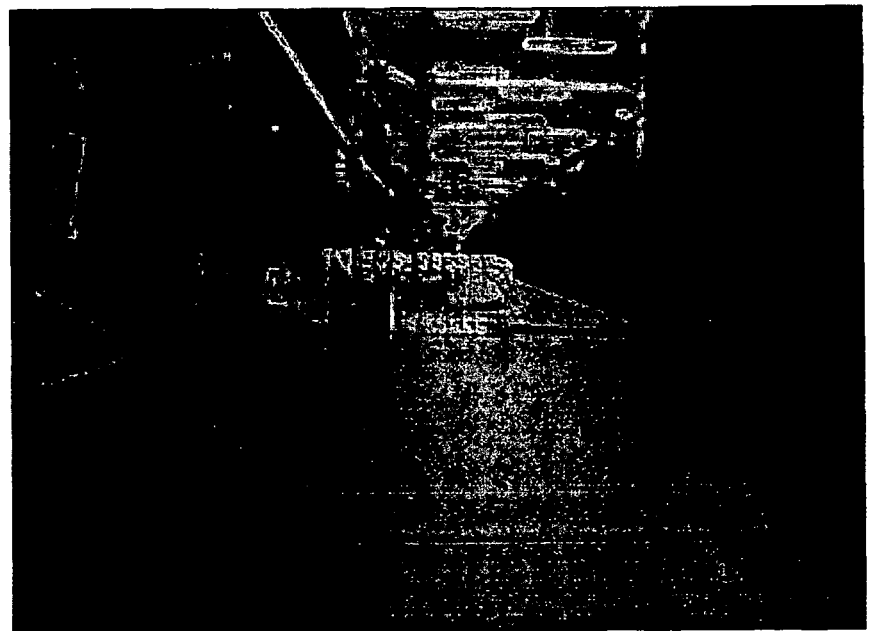
FIGS. 9A and 9B show the image of the first frame and the corresponding BDM.
Figure 9B:
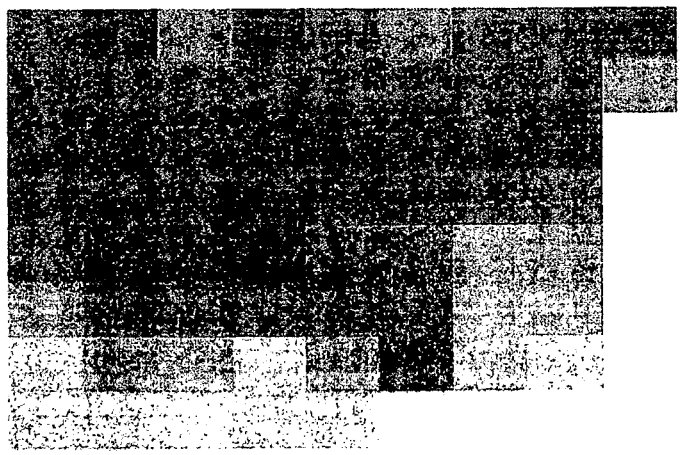
Figure 9C:
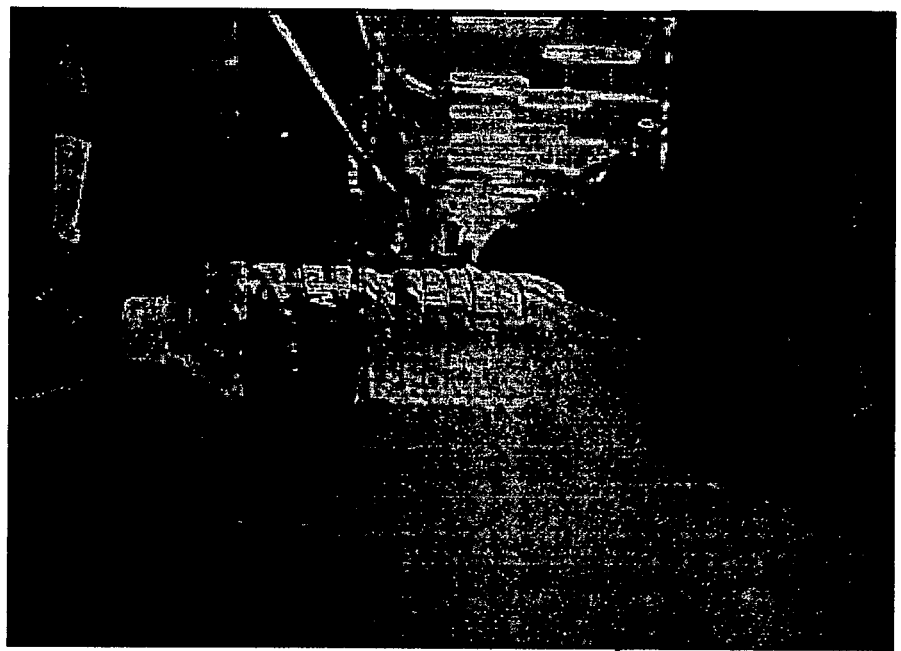
FIGS. 9C and 9D show the $30^{th}$ frame of the video and its corresponding BDM.
Figure 9D:
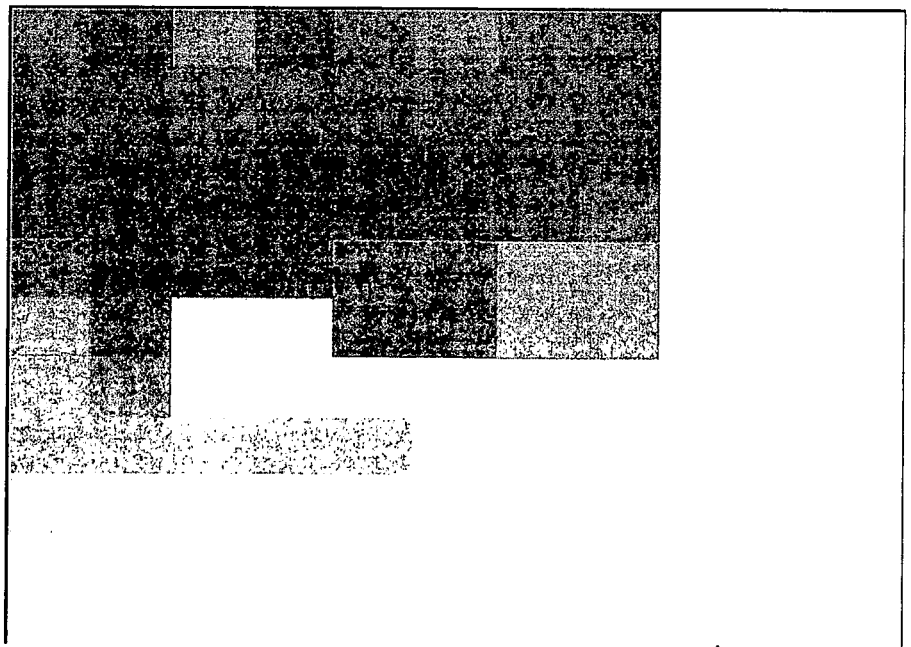
Figure 9E:
FIGS. 9E and 9F show the $60^{th}$ frame of the video and its corresponding BDM.
Figure 9F:
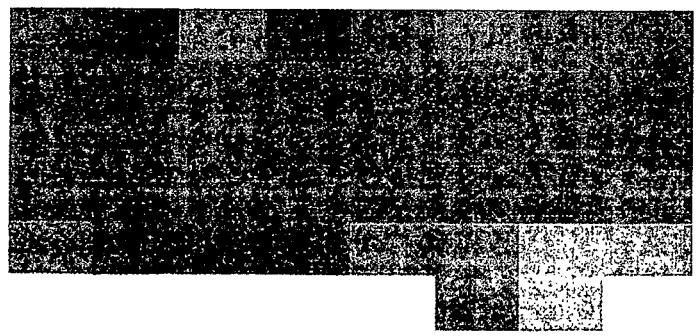

An example for demonstrating the process of FIG. 8 is shown in FIGS. 9A-9F. FIGS. 9A and 9B show the image of the first frame 82 and the corresponding BDM 84. On the other hand, FIGS. 9C and 9D show the 30th frame 86 of the video and its corresponding BDM 88. FIGS. 9E and 9F show the 60th frame 90 of the video and its corresponding BDM 92. In the video, a plastic bottle rolls to the camera from a far distance. It can be readily seen from these figures that the process 132 is capable of catching the movements of the objects in the scene and reflects these activities in the obtained depth maps.

Figure 10A:
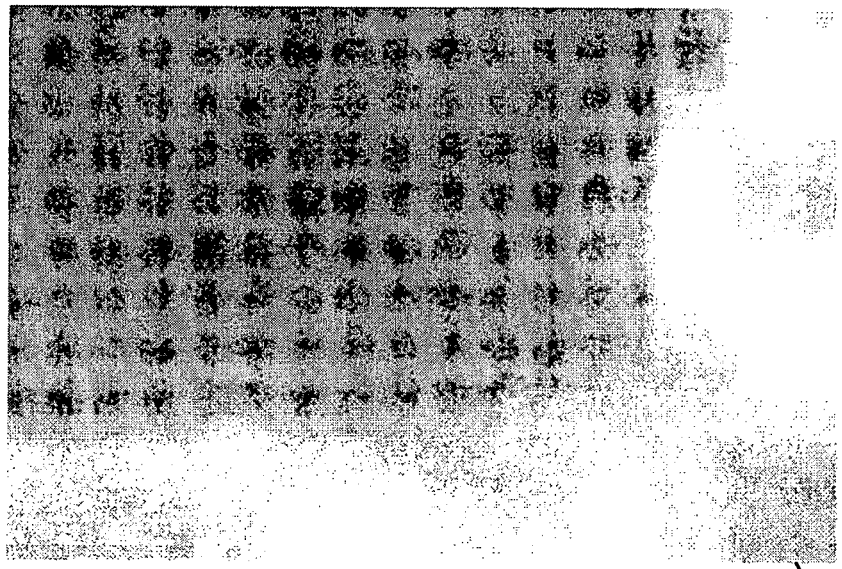
FIGS. 10A, 10B and 10C illustrate the image depth maps (IDMs) generated from the BDMs shown in FIGS. 9B, 9D and 9F.
Figure 10B:
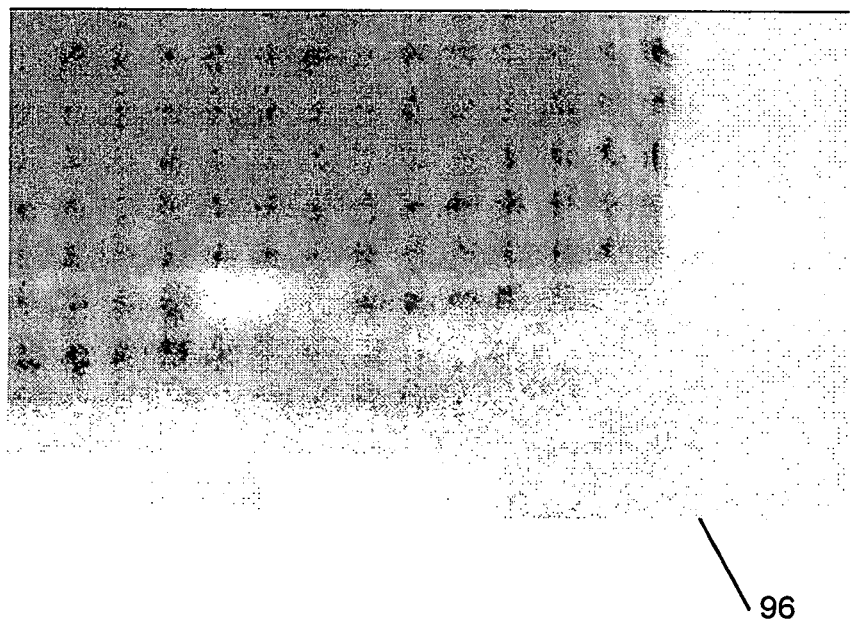
Figure 10C:
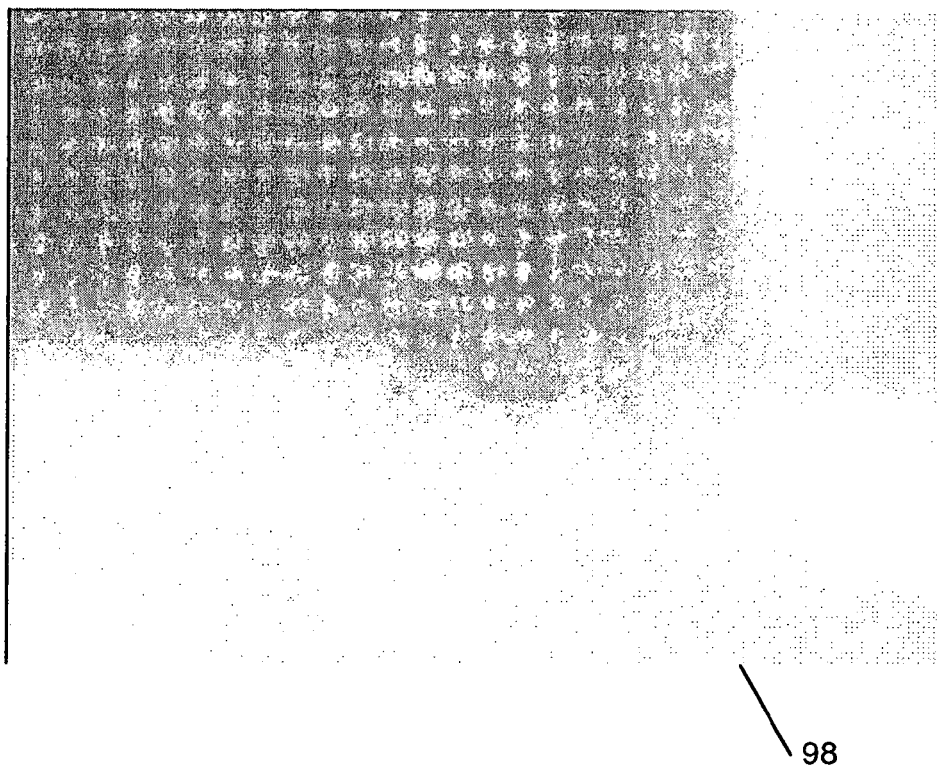

In FIGS. 10A, 10B and 10C, the image depth maps (IDMs) 94, 96 and 98 generated from the BDMs 84, 88, and 92, respectively, shown in FIGS. 9B, 9D and 9F using the process 132. The IDMs 94, 96 and 98 obtained by using the depth detection process 130 (FIG. 3).

Stereo Image Pair Generation

Figure 11:
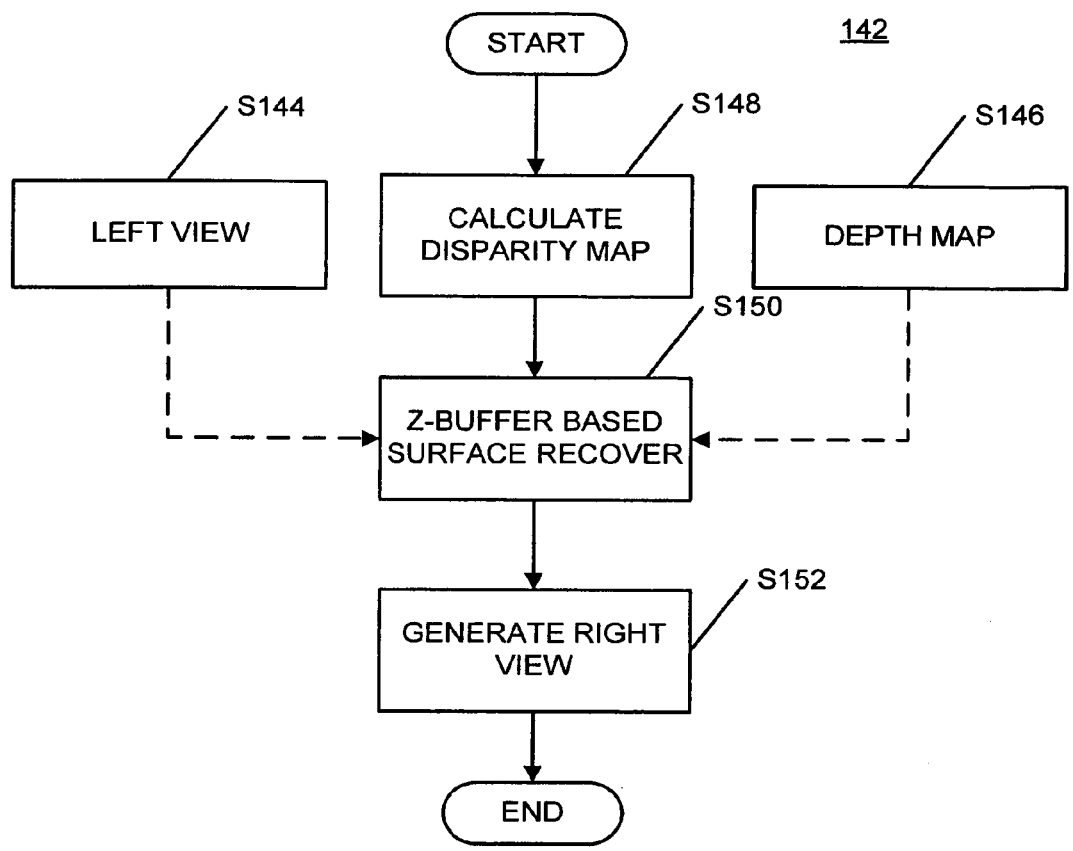
FIG. 11 illustrates the image pair generation process.

Referring now to FIGS. 1 and 11, so far device 10 has captured an image or left view and obtained a corresponding image depth map. The image pair generation module 42 uses an image pair generation process 142 which will now be described. At step S144 the left view is obtained and its corresponding image depth map from the depth detection process 130 or 132 at step S146 is obtained.

While, the image pair generation process 142 first assumes the obtained image is the left view at step S144 of the stereoscopic system alternately, the image could be considered the right view. Then, based on the image depth map obtained at step S146, a disparity map (the distance in pixels between the image points in both views) for the image is calculated at step S148 in the disparity map sub-module 44. The disparity map calculations by the disparity map sub-module 48 will be described below with reference to FIGS. 12A and 12B. Both the left view and the depth map are also input for calculating the disparity map, however, for the 3D view generation, and the left view and the depth map directly contribute to the Z-buffer based surface recovery. Step S148 is followed by step S150 where a Z-buffer based 3D interpolation process 146 by the Z-buffer 3D surface recover sub-module 46 is called to construct a 3D visible surface for the scene from the right eye. Step S150 is followed by step S152 where the right view is obtained by projecting the 3D surface onto a projection plane, as best seen in FIG. 12B. Step S152 is carried out by the stereo view generator sub-module 48.

In FIG. 12A, the geometry model of binocular vision is shown using the Left (L) and Right (R) views on a projection plane for a distant object. In FIG. 12B, F is the focal length, $L(x_L,y_L,0)$ is the left eye, $R(x_R,y_R,0)$ is the right eye, $T(x_T,y_T,z)$ is a 3D point in the scene, and $P(x_P,y_P,F)$ and $Q(x_Q,y_Q,F)$ are the projection points of the T onto the left and right projection planes. Clearly, the horizontal position of P and Q on the projection planes are $(x_P-x_L)$ and $(x_Q-x_R)$, and thus the disparity is $d=[(x_Q-x_R)-(x_P-x_L)]$.

As shown in FIG. 12B, the ratio of F and z is defined in equation Eq.(7) as $$\frac{F}{z} = \frac{x_P - x_L}{x_T - x_L} = \frac{x_Q - x_R}{x_T - x_R} \qquad \text{Eq. (7)}$$

where z is the depth.

so equations Eq.(8) and (9) follow as $$x_P - x_L = \frac{F}{z}(x_T - x_L), \qquad \text{Eq. (8)}$$

$$x_Q - x_R = \frac{F}{z}(x_T - x_R), \qquad \text{Eq. (9)}$$

and thus the disparity d can be obtained by equation Eq.(10)

$$d = \frac{F}{z}(x_L - x_R). \qquad \text{Eq. (10)}$$

Therefore, for every pixel in the left view, its counterpart in the right view is shifted to the left or right side by a distance of the disparity value obtained in Eq. (10). However, the mapping from left-view to right-view is not 1-to-1 mapping due to possible occlusions, therefore further processing is needed to obtain the right-view image.

Therefore, a Z-buffer based 3D interpolation process 146 is performed by the Z-buffer 3D surface recover sub-module 46 for the right-view generation. Since the distance between two eyes compared to the distance from eyes to the objects (as shown in FIG. 12A) is very small, approximately think that the distance from object to the left eye is equal to the distance from itself to the right eye, which would greatly simplify the calculation. Therefore, a depth map Z(x,y) (where Z(x,y) is actually an image depth map, but it is an unknown map to be detected) is maintained for the Right (R) view where x,y are pixel position in the view.

Figure 15A:
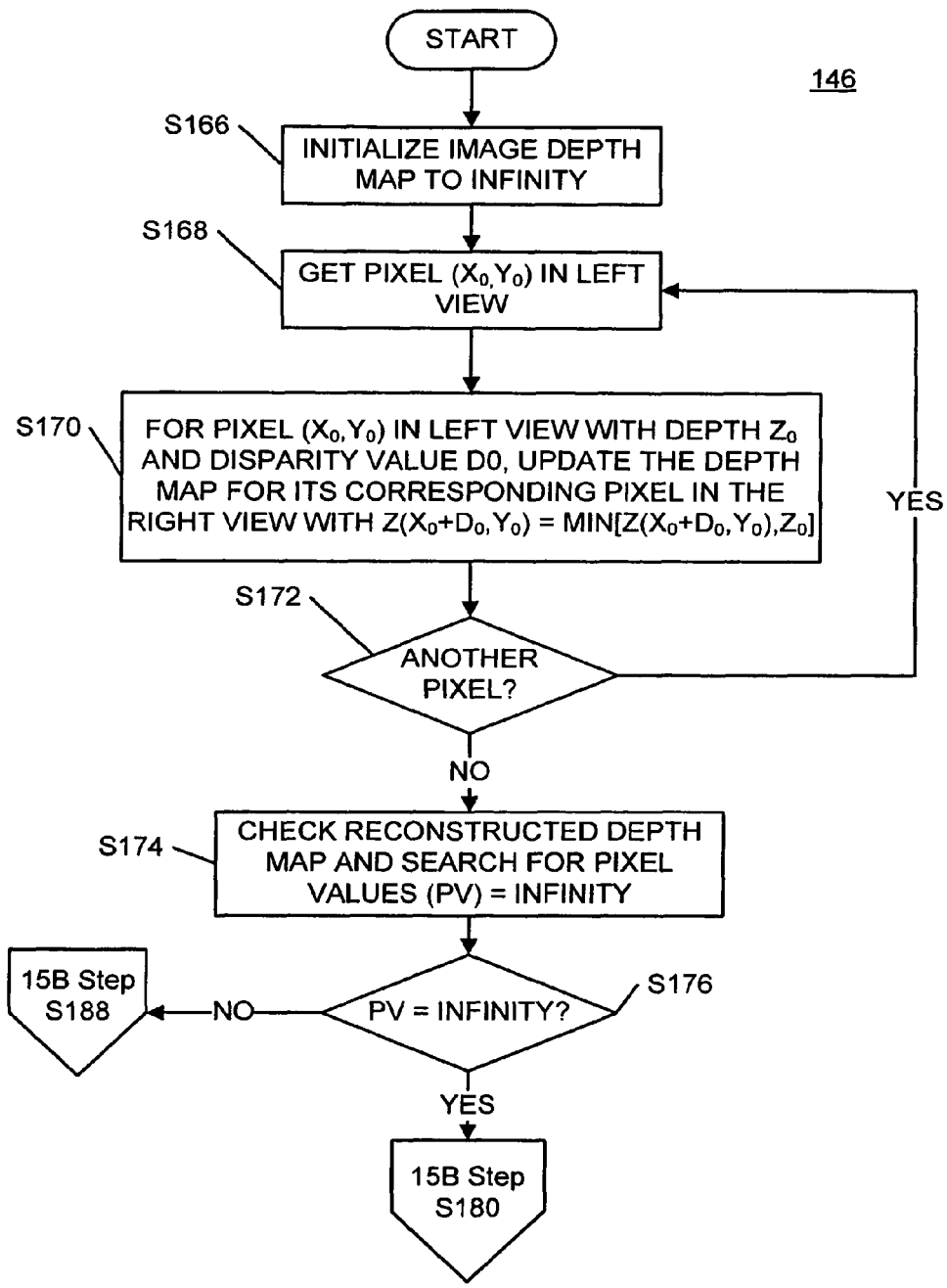
FIGS. 15A-15B illustrate a flowchart of a Z-buffer based 3D interpolation process.
Figure 15B:
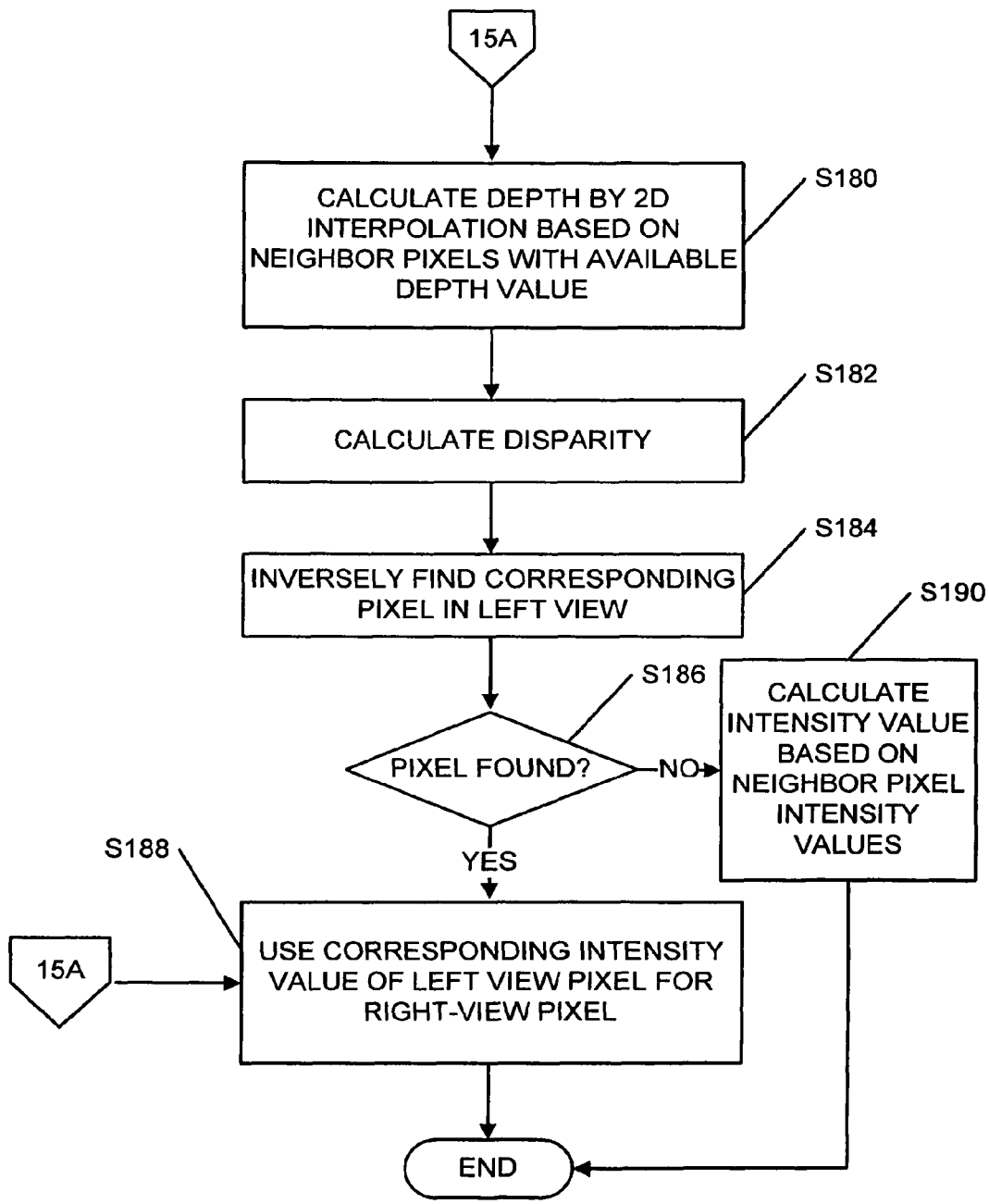

Referring now to FIGS. 15A and 15B, the process 146 to reconstruct the 3D visible surface for the right-view will now be described. At the beginning (step S166), the depth map is initialized as infinity. Step S166 is followed by step S168 where a pixel (x0,y0) in the left view is obtained. Then, for every pixel $(x_0, y_0)$ in the left view with depth $z_0$ and disparity value $d_0$, the depth map is updated for its corresponding pixel in the right view in step S170 by equation Eq.(11) defined as $$Z(x_0+d_0, y_0) = \min[Z(x_0+d_0, y_0), z_0].\qquad\text{Eq.(11)}$$

Step S170 is followed by step S172, a determination step to determine whether there are any more pixels. If the determination is "YES," step S172 returns to step S168 to get the next pixel. On the other hand, after all the pixels in the left-view are processed thus the determination at step S172 is "NO," and step S172 is followed by step S174 where the reconstructed depth map is checked and searched for the pixels with values equal to infinity (the pixels without a valid map on the left-view). Step S174 is followed by step S176 where a determination is made whether a pixel value (PV) is equal to infinity. If the determination at step S176 is "NO," than the pixel value (PV) is valid and can be used directly as the intensity value at step S188 of FIG. 15B.

If the determination at step S176 is "YES," for such pixels, at step S180 first calculates the depth for the corresponding pixel by 2D interpolation based on its neighbor pixels with available depth values. After that at step S182, the disparity value is computed using Eq. 10 above and then at step S184 inversely find the pixel's corresponding pixel in the left view. Step S184 is followed by step S186 to determine if a pixel is found. If the corresponding pixel is available, step S186 is followed by step S188 where the corresponding intensity value can be used on the right-view pixel. Otherwise, if the determination at step S186 is "NO," step S186 is followed by step S190 which uses interpolation to calculate the intensity value based on its neighbor pixels in the right-view with available intensity values.

It is important to point out that the benefits of using the proposed algorithm over the direct intensity interpolation method is that it considers the 3D continuity of the object shape which results in better realism for stereo effect. Clearly, the problem of recovering invisible area of left view is an ill-posed problem. In one known solution, the depth of missing pixel is recovered by using its neighbor pixel in horizontal direction corresponding to further surface with an assumption that no other visible surfaces behind is in the scene. For some cases, the assumption might be invalid. To consider more possible cases, in the proposed solution, the surface recovering considers depths of all neighbor pixels in all directions, which will reduce the chances of invalid assumption and will result in better 3D continuity of the recovered surface.

Experimental Results

The device 10 can be implemented in a MSM8K VFE C-SIM system. Experimental results indicate that the captured and generated stereo images and videos have superior 3D effects.

Figure 13A:
FIG. 13A shows an anaglyph image generated by using the approximated image depth map shown in FIG. 6E.
Figure 13B:
FIG. 13B shows an anaglyph image generated by using the accurate image depth map shown in FIG. 6B.
Figure 14A:
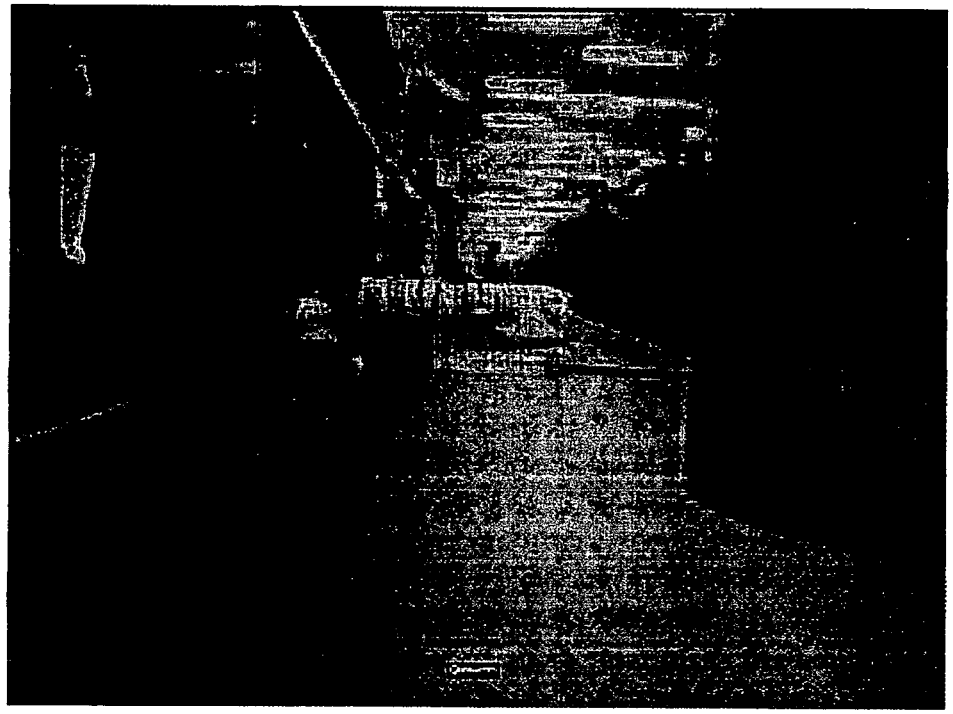
FIG. 14A shows an example of a resultant anaglyph video frame of FIG. 9A.
Figure 14B:
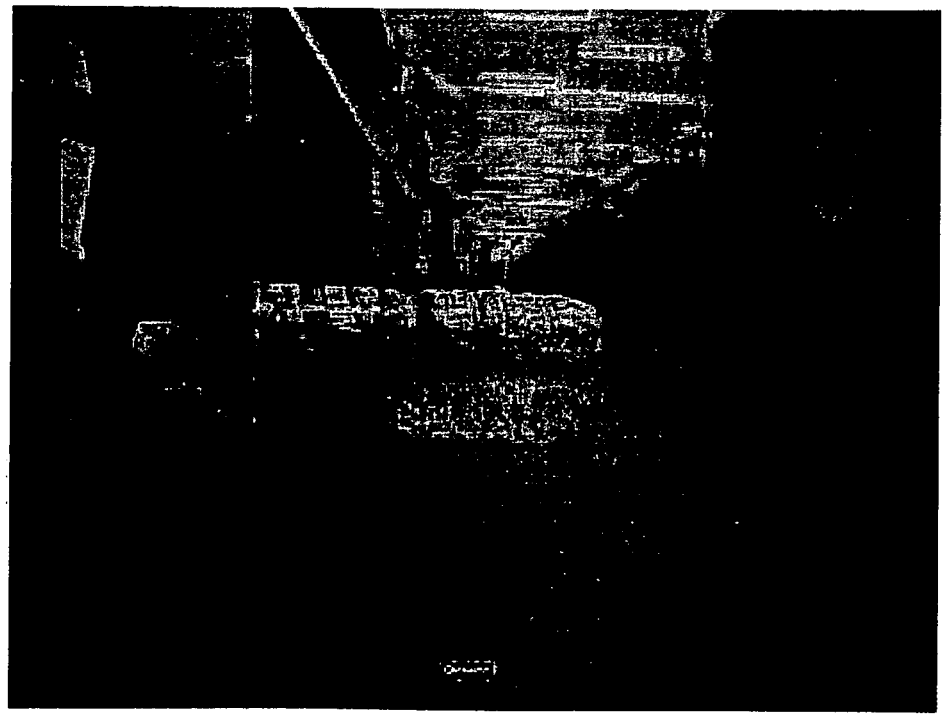
FIG. 14B shows an example of a resultant anaglyph video frame of FIG. 9C.
Figure 14C:
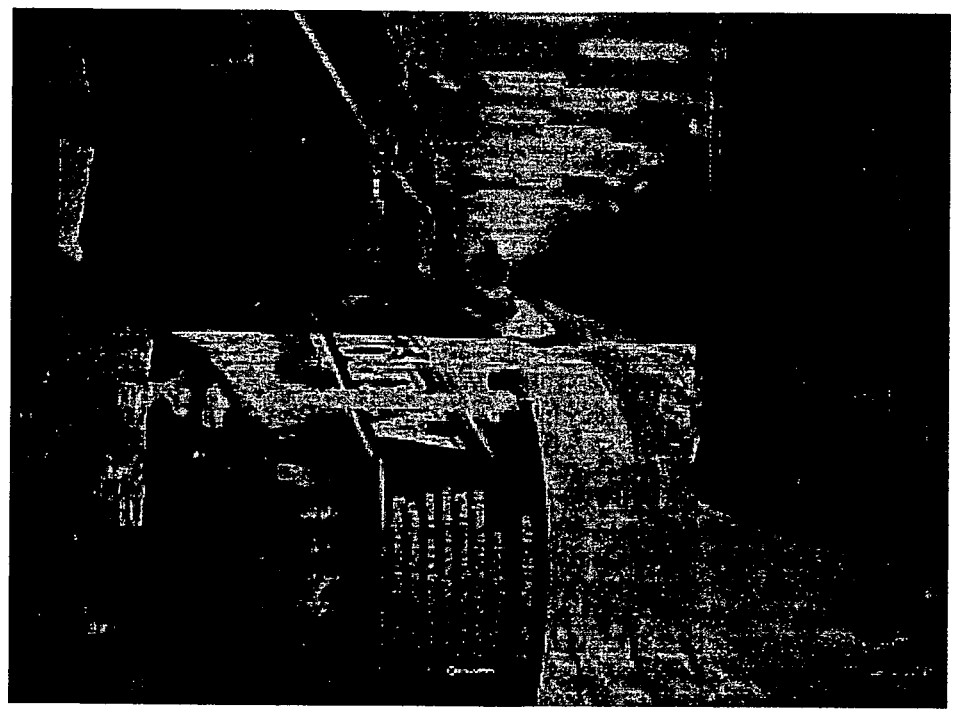
FIG. 14C shows an example of a resultant anaglyph video frame of FIG. 9E.

In the experiments, an inexpensive red-blue anaglyph generation process 152 was used to demonstrate the resulted 3D effect, although the generated stereo views are feasible to be displayed by other mechanisms such as holographic and stereoscopic devices. In the first experiment, the stereo image pairs were calculated using different kinds of image depth map and generated the corresponding anaglyph images. As shown in FIGS. 13A and 13B. FIG. 13A is generated by using the approximated image depth map shown in FIG. 6E, and the FIG. 13B is generated by using the accurate image depth map shown in FIG. 6B. Clearly, the results indicate that the approximated image depth map result in a similar image quality as using the accurate depth map, which proves the good performance.

In summary, the monoscopic low-power mobile device 10 provides real-time capturing and generation of stereo images and videos. The device 10 employs the autofocusing processes of a monoscopic camera sensor module 14 to capture and generate the stereo images and videos. The autofocusing process of the camera sensor is utilized to estimate the depth information of the remote objects in the scene. For video capturing, a low-complexity algorithm is provided to detect the block depth map based on motion information, focus value, and frame history statistics.

The device 10 is constructed for real-time applications so that computational complexity is a major concern. However, device 10 estimates the object depth in a coarse-to-fine strategy, that is, the image is divided into a number of blocks so that an associated block depth map can be detected quickly. Then a bilinear filter is employed to convert the block depth map into an approximated image depth map. For stereo image generation, a low-complexity Z-buffer based 3D surface recovering approach to estimate the missing views.

Experimental results indicate that the captured and generated stereo images and videos have satisfactory 3D effects. The better focus functionality of the sensor module 14, the more accurate the estimated depth map will be, and thus the better the stereo effect the produced image and video have.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:
1. A monoscopic low-power mobile device comprising:
a single-sensor camera configured to capture an image from a first viewpoint;
an autofocusing module configured to determine a best focus position by moving a lens of the single-sensor camera through an entire focusing range via a focusing process and to select the focus position with a maximum focus value when capturing the image;
a depth map generator assembly in data communication with the autofocusing module and the single-sensor camera, the depth map generator assembly configured to:
in a first-stage, develop a block-level depth map automatically using statistics from the autofocusing module,
in a second-stage to develop an image depth map, the block-level depth map including a depth value for each of a plurality of portions of the captured image, the image depth map including a pixel depth value for a pixel in a portion of the plurality of portions, and
during the second stage, obtain a depth value for corner pixels of each block included in the block-level depth map, the depth value for a corner pixel based at least in part on an average of depth values for middle points of neighboring blocks of a respective block, the neighboring blocks included in the block-level depth map;
a bilinear filter in data communication with the depth map generator assembly, the bilinear filter configured to generate the pixel depth value for the pixel based at least in part on depth values for each corner pixel, the depth values for each corner pixel weighted based on a ratio between a distance of the pixel to a respective corner pixel and a total distance of the pixel to each corner pixel, the bilinear filter configured to generate the pixel depth value during the second-stage; and
an image generator configured to create a second image having a second viewpoint from the captured image, the second viewpoint being different from the first viewpoint.

2. The device of claim 1, wherein the image generator comprises:
a disparity map module configured to calculate a disparity map based on a distance in pixels between image points in views of a vision geometry model for the captured image, the captured image representing one view of the views of the vision geometry model;
a surface recover module configured to construct a surface for the second image from the second viewpoint; and
a view generator module configured to generate the second image based on a projection of the constructed surface for the second image onto a projection plane.

3. The device of claim 1, wherein generating the pixel depth value for the pixel based at least in part on depth values for each corner pixel comprises generating the pixel depth value $d_P$ for pixel P $(x_P, y_P, d_P)$ in accordance with the equation $$d_p = \frac{(x_p - x_A)^4 + (y_p - y_A)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_A +$$

$$\frac{(x_p - x_B)^4 + (y_p - y_B)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_B +$$

$$\frac{(x_p - x_C)^4 + (y_p - y_C)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_C +$$

$$\frac{(x_p - x_D)^4 + (y_p - y_D)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_D$$

where position values and the depth values for the corner pixels (A, B, C, and D) of the block are denoted as $(x_A, y_A, d_A)$, $(x_B, y_B, d_B)$, $(x_C, y_C, d_C)$, $(x_D, y_D, d_D)$.

4. The device of claim 1, wherein the focusing process of the autofocusing module in a still image mode performs an exhaustive search focusing process to capture a still-image, and in a video mode, to achieve real-time capturing of a video clip, is initiated with the exhaustive search focusing process and follows with a climbing-hill focusing process.

5. The device of claim 4, further comprising a video coding module for coding the video clip captured and providing statistics information for calculating the block-level depth map, the video coding module configured to determine motion estimation, and the depth map generator assembly configured in the second stage to detect and estimate depth information for real-time capturing and generation of video from the second viewpoint using the statistics information from the motion estimation, the focusing process, and history data plus heuristic rules to obtain a final block depth map from which the image depth map is derived.

6. The device of claim 4, wherein the autofocusing module is further configured to process the captured video clip and estimate depth information of remote objects in a scene, the autofocusing module configured to generate an autofocusing block depth map and an autofocusing focus value map for frames of the captured video clip, and
wherein the video coding module is configured to generate a video coding block depth map and a video coding focus value map for frames of the captured video clip based at least in part on the determined motion estimation, and
wherein the device further comprises:
an image depth map module operable to detect and estimate depth information for real-time capturing and generation of video from the second viewpoint based on a final block depth map from which an image depth map is derived, the block depth map including a depth value for each of a plurality of portions of the captured video clip, the image depth map including a pixel depth value for a pixel in a portion of the plurality of portions, the image depth map module configured to generate the final block depth map based on values included in the autofocusing block depth map, the autofocusing focus value map, the video coding block depth map, and the video coding focus value map.

7. The device of claim 6, wherein the image depth map module is configured to predict an internal block depth map $(P_n(i,j))$ and a focus value map $(T_n(i,j))$ of a current frame n from those of a previous frame by the following equations $$P_n(i, j) = \begin{cases} D_{n-1}(a, b) & \text{if } |V_n(i, j) - F_{n-1}(a, b)| < \text{FV\_TH} \\ D_{n-1}(i, j) & \text{otherwise} \end{cases}$$

and $$T_n(i, j) = \begin{cases} F_{n-1}(a, b) & \text{if } |V_n(i, j) - F_{n-1}(a, b)| < \text{FV\_TH} \\ F_{n-1}(i, j) & \text{otherwise} \end{cases}$$

where $\{P_n(i, j)\}$ and $\{T_n(i, j)\}$ are the video coding BDM and the video coding FV map (a,b) denotes a block in (n−1)st frame and is a prediction of block (i, j) in the nth frame, and FV_TH is a focus value (FV) threshold; and
wherein a focal lens position corresponds to a largest FV and is treated as the best choice wherein the final BDM and FV map are determined by the following equations $$D_n(i, j) = \begin{cases} D_{n-1}(i, j) & \text{if } F_{n-1}(i, j) \geq V_n(i, j) \,\&\, F_{n-1}(i, j) \geq T_n(i, j) \\ M_n(i, j) & \text{if } V_n(i, j) \geq F_{n-1}(i, j) \,\&\, V_n(i, j) \geq T_n(i, j) \\ P_n(i, j) & \text{if } T_n(i, j) \geq F_{n-1}(i, j) \,\&\, T_n(i, j) \geq V_n(i, j) \end{cases}$$

and $$F_n(i,j) = \max \left[ F_{n-1}(i,j), V_n(i,j), T_n(i,j) \right]$$

where $\{D_n(i,j)\}$ and $\{F_n(i,j)\}$ (i=1, 2, ... N, j=1, 2, ... N) are the final determined block depth map (BDM) and the final determined focus value (FV) map, respectively, of the current frame, and $\{M_n(i, j)\}$ and $\{V_n(i, j)\}$ are the autofocus BDM and the autofocus FV map.

8. The device of claim 1, wherein the depth map generator assembly in the second stage is configured to reduce artifacts with the bilinear filter.

9. The device of claim 1, further comprising a display configured to display at least one of the captured image or the second image.

10. The device of claim 9, wherein the image generator module is further configured to produce a composite image of the captured image and the second image for presentation on the display.

11. The device of claim 1, wherein the monoscopic low-power mobile device comprises one of a hand-held digital camera, a camcorder, and a single-sensor camera phone.

12. A method for generating real-time viewpoint images, the method comprising:
   capturing an image from a first viewpoint with a single sensor;
   autofocusing a lens and determining a best focus position by moving the lens through an entire focusing range and selecting the focus position with a maximum focus value when capturing the image;
   generating in a first-stage a block-level depth map automatically using statistics from the autofocusing and in a second-stage generating an image depth map, the block-level depth map including a depth value for each of a plurality of portions of the captured image, the image depth map including a pixel depth value for a pixel in a portion of the plurality of portions, the second-stage generating including:
      obtaining a depth value for corner pixels of each block included in the block-level depth map, the depth value for a corner pixel based at least in part on an average of depth values for middle points of neighboring blocks of a respective block, the neighboring blocks included in the block-level depth map; and
      generating the pixel depth value for the pixel based at least in part on depth values for each corner pixel, the depth values for each corner pixel weighted based on a ratio between a distance of the pixel to a respective corner pixel and a total distance of the pixel to each corner pixel; and
   creating a second image having a second viewpoint from the captured image, the second viewpoint being different from the first viewpoint.

13. The method of claim 12, wherein creating the second image comprises:
   calculating a disparity map based on a distance in pixels between image points in views of a vision geometry model for the captured image, the captured image representing one of the view of the vision geometry model;
   constructing a surface for the second image from the second viewpoint; and
   generating the second image by projecting the constructed surface onto a projection plane.

14. The method of claim 12, wherein generating the pixel depth value for the pixel based at least in part on depth values for each corner pixel comprises generating pixel depth value $d_P$ for pixel P $(x_P, y_P, d_P)$ in accordance with equation $$d_p = \frac{(x_p - x_A)^4 + (y_p - y_A)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_A +$$

$$\frac{(x_p - x_B)^4 + (y_p - y_B)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_B +$$

$$\frac{(x_p - x_C)^4 + (y_p - y_C)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_C +$$

$$\frac{(x_p - x_D)^4 + (y_p - y_D)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_D$$

where position values and the depth values for the corner pixels (A, B, C, and D) of the block are denoted as $(x_A, y_A, d_A)$, $(x_B, y_B, d_B)$, $(x_C, y_C, d_C)$, $(x_D, y_D, d_D)$.

15. The method of claim 12, wherein autofocusing includes:
   performing an exhaustive search focusing process to capture a still-image in a still image mode;
   initiating the exhaustive search focusing process in a video mode; and
   climbing-hill focusing in a video mode to capture a real-time video clip.

16. The method of claim 15, further comprising video coding the video clip and motion estimating, wherein generating the block-level depth map includes detecting and estimating depth information for real-time capturing and generation of video from the second viewpoint using statistics from the motion estimating the autofocusing and history data plus heuristic rules to obtain a final block depth map from which the image depth map is derived.

17. The method of claim 15, further comprising:
   processing the captured video clip;
   estimating depth information of remote objects in a scene;
   generating an autofocusing block depth map and an autofocusing focus value map for frames of the captured video clip;
   generating a video coding block depth map and a video coding focus value map for frames of the captured video clip based at least in part on the determined motion estimation;
   generating estimated depth information for real-time capturing and generation of video from the second viewpoint based on a final block depth map from which an image depth map is derived, the block depth map including a depth value for each of a plurality of portions of the captured video clip, the image depth map including a pixel depth value for a pixel in a portion of the plurality of portions;
   generating the final block depth map based on values included in the autofocusing block depth map, the autofocusing focus value map, the video coding block depth map, and the video coding focus value map.

18. The method of claim 17, comprising predicting an internal block depth map $(P_n(i,j))$ and a focus value map $(T_n(i,j))$ of a current frame n from those of a previous frame by the following equations $$P_n(i,j) = \begin{cases} D_{n-1}(a,b) & \text{if } |V_n(i,j) - F_{n-1}(a,b)| < \text{FV\_TH} \\ D_{n-1}(i,j) & \text{otherwise} \end{cases}$$

and $$T_n(i,j) = \begin{cases} F_{n-1}(a,b) & \text{if } |V_n(i,j) - F_{n-1}(a,b)| < \text{FV\_TH} \\ F_{n-1}(i,j) & \text{otherwise} \end{cases}$$

where $\{P_n(i,j)\}$ and $\{T_n(i,j)\}$ are the video coding BDM and the video coding FV map (a,b) denotes a block in (n−1)st frame and is a prediction of block (i, j) in the nth frame, and FV_TH is a focus value (FV) threshold; and wherein a focal lens position corresponds to a largest FV and is treated as the best choice wherein the final BDM and FV map are determined by the following equations $$D_n(i,j) = \begin{cases} D_{n-1}(i,j) & \text{if } F_{n-1}(i,j) \geq V_n(i,j) \, \& F_{n-1}(i,j) \geq T_n(i,j) \\ M_n(i,j) & \text{if } V_n(i,j) \geq F_{n-1}(i,j) \, \& V_n(i,j) \geq T_n(i,j) \\ P_n(i,j) & \text{if } T_n(i,j) \geq F_{n-1}(i,j) \, \& T_n(i,j) \geq V_n(i,j) \end{cases}$$

and $$F_n(i,j) = \max[F_{n-1}(i,j), V_n(i,j), T_n(i,j)]$$

where $\{D_n(i,j)\}$ and $\{F_n(i,j)\}$ (i=1, 2, ... N, j=1, 2, ... N) are the final determined block depth map (BDM) and the final determined focus value (FV) map, respectively, of the current frame, and $\{M_n(i,j)\}$ and $\{V_n(i,j)\}$ are the autofocus BDM and the autofocus FV map.

19. The method of claim 12, further comprising reducing artifacts with the bilinear filter in the second stage.

20. The method of claim 12, further comprising displaying at least one of the captured image or the second image.

21. The method of claim 20, further comprising producing a composite image of the captured image and the second image for presentation on the display.

22. A monoscopic low-power mobile device comprising:
means for capturing an image from a first viewpoint with a single sensor;
means for autofocusing a lens and determining a best focus position by moving the lens through an entire focusing range and for selecting the focus position with a maximum focus value when capturing the image;
means for generating in a first-stage a block-level depth map automatically using statistics from the autofocusing means and in a second-stage an image depth map, the block-level depth map including a depth value for each of a plurality of portions of the captured image, the image depth map including a pixel depth value for a pixel in a portion of the plurality of portions, wherein during the second stage, a depth value for corner pixels of each block included in the block-level depth map is obtained, the depth value for a corner pixel based at least in part on an average of depth values for middle points of neighboring blocks of a respective block, the neighboring blocks included in the block-level depth map,
the means for generating including means for reducing artifacts configured to, during the second-stage, generate the pixel depth value for the pixel based at least in part on depth values for each corner pixel, the depth values for each corner pixel weighted based on a ratio between a distance of the pixel to a respective corner pixel and a total distance of the pixel to each corner pixel; and
means for creating a second image having a second viewpoint from the captured image, the second viewpoint being a different from the first viewpoint.

23. The device of claim 22, wherein the means for creating the second image comprises:
means for calculating a disparity map based on a distance in pixels between image points in views of a vision geometry model for the captured image, the captured image representing one of the views of the vision geometry model;
means for constructing a surface for second image from the second viewpoint; and
means for generating the second image by projecting the constructed surface onto a projection plane.

24. The device of claim 22, wherein generating the pixel depth value for the pixel based at least in part on depth values for each corner pixel comprises generating the pixel depth value $d_P$ for pixel P ($x_P$, $y_P$, $d_P$) in accordance with the equation $$d_p = \frac{(x_p - x_A)^4 + (y_p - y_A)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_A +$$

$$\frac{(x_p - x_B)^4 + (y_p - y_B)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_B +$$

$$\frac{(x_p - x_C)^4 + (y_p - y_C)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_C +$$

$$\frac{(x_p - x_D)^4 + (y_p - y_D)^4}{(x_p - x_A)^4 + (y_p - y_A)^4 + (x_p - x_B)^4 + (y_p - y_B)^4 + (x_p - x_C)^4 + (y_p - y_C)^4 + (x_p - x_D)^4 + (y_p - y_D)^4} d_D$$

where position values and the depth values for the corner pixels (A, B, C, and D) of the block are denoted as ($x_A$, $y_A$, $d_A$), ($x_B$, $y_B$, $d_B$), ($x_C$, $y_C$, $d_C$), ($x_D$, $y_D$, $d_D$).

25. The device of claim 22, wherein the autofocusing means includes means for performing an exhaustive search focusing process to capture a still-image in a still image mode; means for initiating the exhaustive search focusing process in a video mode; and means for climbing-hill focusing in a video mode to capture a real-time video clip.

26. The device of claim 25, further comprising means for video coding the video clip captured and providing statistics information; wherein the means for video coding includes means for motion estimating; and wherein the generating means includes means for detecting and estimating depth information for real-time capturing and generation of video from the second viewpoint using statistics information from the motion estimating means, the autofocusing means, and history data plus some heuristic rules to obtain a final block depth map from which the image depth map is derived.

27. The device of claim 22, further comprising a display and means for providing at least one of the captured image or the second image for presentation on the display.

28. The device of claim 22, wherein the means for providing at least one of the captured image or the second image is configured to produce a composite image of the captured image and the second image for presentation on the display.

29. The device of claim 22, wherein the monoscopic low-power mobile device comprises one of a hand-held digital camera, a camcorder, and a single-sensor camera phone.

30. A non-transitory computer-readable medium comprising instructions, the instructions executable by a processor of a monoscopic low-power mobile device, the instructions, when executed by the processor, cause the device to:
  capture an image from a first viewpoint with a single sensor;
  autofocus a lens and determining a best focus position by moving the lens through an entire focusing range and selecting the focus position with a maximum focus value when capturing the image;
  generate in a first-stage a block-level depth map automatically using statistics from the autofocusing and in a second-stage generate an image depth map, the block-level depth map including a depth value for each of a plurality of portions of the captured image, the image depth map including a pixel depth value for a pixel in a portion of the plurality of portions, wherein the second-stage generating includes:
    obtaining a depth value for corner pixels of each block included in the block-level depth map, the depth value for a corner pixel based at least in part on an average of depth values for middle points of neighboring blocks of a respective block, the neighboring blocks included in the block-level depth map; and
    generating the pixel depth value for the pixel based at least in part on depth values for each corner pixel, the depth values for each corner pixel weighted based on a ratio between a distance of the pixel to a respective corner pixel and a total distance of the pixel to each corner pixel; and
  create a second image having a second viewpoint from the captured image, the second viewpoint being different from the first viewpoint.

* * * * *